US012597381B2

(12) United States Patent
Lee et al.

(10) Patent No.: US 12,597,381 B2
(45) Date of Patent: Apr. 7, 2026

(54) DISPLAY DEVICE AND DRIVING METHOD THEREOF

(71) Applicant: LG Display Co., Ltd., Seoul (KR)

(72) Inventors: Hyun Suk Lee, Paju-si (KR); Seung Jin Yoo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/934,950

(22) Filed: Nov. 1, 2024

(65) Prior Publication Data

US 2025/0218350 A1 Jul. 3, 2025

(30) Foreign Application Priority Data

Dec. 27, 2023 (KR) ........................ 10-2023-0192152

(51) Int. Cl.
*G09G 3/32* (2016.01)

(52) U.S. Cl.
CPC ....... *G09G 3/32* (2013.01); *G09G 2300/0842* (2013.01); *G09G 2310/0289* (2013.01); *G09G 2310/08* (2013.01); *G09G 2320/0242* (2013.01); *G09G 2330/021* (2013.01)

(58) Field of Classification Search
CPC ... G09G 3/32–3291; G09G 2300/0842; G09G 2300/0861; G09G 2300/0866; G09G 2310/0243; G09G 2310/0264–0275; G09G 2310/0289; G09G 2310/06; G09G 2310/08; G09G 2320/0233; G09G 2320/0242; G09G 2320/0271; G09G 2320/0276; G09G 2320/04–048; G09G 2320/0686; G09G 2330/021; G09G 2330/028
See application file for complete search history.

(56) References Cited

U.S. PATENT DOCUMENTS

| | | | | |
|---|---|---|---|---|
| 2014/0139565 A1* | 5/2014 | Choi | .................... | G09G 3/3233 345/82 |
| 2017/0018222 A1* | 1/2017 | Park | ...................... | G09G 3/3233 |
| 2017/0263173 A1* | 9/2017 | Lin | ...................... | G09G 3/2092 |
| 2019/0325825 A1* | 10/2019 | Tseng | ................... | G09G 3/3233 |
| 2022/0044634 A1* | 2/2022 | Ka | ........................ | G09G 3/3258 |

FOREIGN PATENT DOCUMENTS

| | | |
|---|---|---|
| KR | 10-2019-0122056 A | 10/2019 |
| KR | 10-2023-0001881 A | 1/2023 |

* cited by examiner

*Primary Examiner* — Nathan Danielsen
(74) *Attorney, Agent, or Firm* — Fenwick & West LLP

(57) ABSTRACT

A display device includes: a first sub-pixel configured to receive a first data voltage and drive a first light emitting element included in the first sub-pixel; a second sub-pixel configured to receive a second data voltage and drive a second light emitting element included in the second sub-pixel; a third sub-pixel configured to receive a third data voltage and drive a third light emitting element included in the third sub-pixel. At least one of dynamic ranges, maximum voltages, and minimum voltages of the first data voltage, the second data voltage, and the third data voltage are different from each other. An emission time of the first light emitting element, an emission time of the second light emitting element, and an emission time of the third light emitting element are different from each other.

26 Claims, 19 Drawing Sheets

DISPLAY DEVICE AND DRIVING METHOD THEREOF

CROSS-REFERENCE TO RELATED APPLICATION

This application claims priority to and the benefit of Republic of Korea Patent Application No. 10-2023-0192152, filed Dec. 27, 2023, which is hereby incorporated by reference in its entirety.

BACKGROUND

Field

The present disclosure relates to a display device and driving method thereof.

Discussion of Related Art

Various flat panel display devices, such as a liquid crystal display device and an electroluminescent display device, are known. The electroluminescent display device may use light emitting elements arranged in each pixel to emit light by itself without a backlight, thereby displaying an input image. The light emitting elements of the electroluminescent display device may be divided into an organic light emitting element and an inorganic light emitting element depending on the material of a light emitting layer.

Recently, a display device that uses a light emitting diode (LED), which is an inorganic light emitting element, as a light emitting element of a pixel has attracted attention as a next-generation display device. Since the LED is made of an inorganic material, it does not require a separate encapsulation layer to protect an organic material from moisture, and it has superior reliability and long lifespan compared to an organic light emitting diode (OLED). In addition, the LED has a fast light-up speed, excellent luminous efficiency, and impact resistance.

Light emitting elements such as micro-LEDs and OLEDs emit light by means of a current, but the current is difficult to control. A pixel circuit that drives the light emitting element applies a data voltage to a driving transistor to supply a current to the light emitting element by using the driving transistor as a constant current source. As the data voltage increases, the gate-source voltage of the driving transistor increases, and the amount of current flowing through the light emitting element increases, thereby allowing the luminance of the light emitting element to increase.

In the case of inorganic light emitting elements such as micro-LEDs, the luminous efficiency is high in a specific current region due to the material properties of the light emitting layer. Luminous efficiency is an efficiency expressed as luminance versus a current applied to a light emitting element. Although the effect of reducing the current consumption of the light emitting element can be achieved in the high efficiency range, the data voltage increases to achieve a high luminous efficiency. Due to the material properties of the light emitting layer, a higher data voltage is required to increase the luminous efficiency in the case of an inorganic light emitting element of a specific color. As the data voltage increases, the luminance of the inorganic light emitting element may become excessively high. This causes the color coordinates and white balance to deviate from a target value, resulting in deterioration of image quality.

SUMMARY

The present disclosure has been made in an effort to address aforementioned necessities and/or drawbacks.

The present disclosure provides a display device and driving method thereof capable of driving a light emitting element with maximum luminous efficiency for each color and improving image quality.

The problems or limitations to be solved or addressed by the present disclosure are not limited to those mentioned above, and other problems or limitations not mentioned will be clearly understood by those skilled in the art from the following description.

In one embodiment, a display device comprises: a first sub-pixel including a first light emitting element, the first sub-pixel configured to receive a first data voltage and drive the first light emitting element using the first data voltage; a second sub-pixel including a second light emitting element, the second sub-pixel configured to receive a second data voltage and drive the second light emitting element using the second data voltage; a third sub-pixel including a third light emitting element, the third sub-pixel configured to receive a third data voltage and drive the third light emitting element using the third data voltage; and a luminance adjuster circuit configured to reduce a luminance of at least one of the first sub-pixel, the second sub-pixel, or the third sub-pixel, wherein a first emission time of the first light emitting element during which the first light emitting element emits light, a second emission time of the second light emitting element during which the second light emitting element emits light, and a third emission time of the third light emitting element during which the third light emitting element emits light are different from each other.

In one embodiment, a display device comprises: a first sub-pixel including a first light emitting element, a first driving element configured to control a current flowing through the first light emitting element based on a gate-source voltage of the first light emitting element, a first switch element configured to switch a current path of the first light emitting element between a pixel driving voltage and a pixel base voltage in response to a first emission signal, and a first compensation circuit configured to receive a first data voltage and a scan signal and apply the first data voltage to a gate electrode of the first driving element; a second sub-pixel including a second light emitting element, a second driving element configured to control a current flowing through the second light emitting element based on a gate-source voltage of the second driving element, a second switch element configured to switch a current path of the second light emitting element between the pixel driving voltage and the pixel base voltage in response to a second emission signal, and a second compensation circuit configured to receive a second data voltage and the scan signal and apply the second data voltage to a gate electrode of the second driving element; a third sub-pixel including a third light emitting element, a third driving element configured to control a current flowing through the third light emitting element based on a gate-source voltage of the third driving element, a third switch element configured to switch a current path of the third light emitting element between the pixel driving voltage and the pixel base voltage in response to a third emission signal, and a third compensation circuit configured to receive a third data voltage and the scan signal and apply the third data voltage to a gate electrode of the third driving element; and a luminance adjuster circuit configured to independently control one of the pixel driving voltage or the first emission signal, the second emission signal, and the third emission signal in each of the first sub-pixel, the second sub-pixel, and the third sub-pixel such that a luminance of at least one of the first sub-pixel, the second sub-pixel, and the third sub-pixel is reduced.

In one embodiment, a method of driving a display device comprises: supplying a first data voltage to a first sub-pixel that drives a first light emitting element using the first data voltage, supplying a second data voltage to a second sub-pixel that drives a second light emitting element using the second data voltage, and supplying a third data voltage to a third sub-pixel that drives a third light emitting element using the third data voltage; and controlling a first emission time of the first light emitting element, a second emission time of the second light emitting element, and a third emission time of the third light emitting element to be different from each other such that a luminance of at least one of the first sub-pixel, the second sub-pixel, and the third sub-pixel is reduced.

In one embodiment, a display device comprises: a display panel including a plurality of pixels, the plurality of pixels having at least one-pixel comprising a first sub-pixel configured to emit light of a first color, a second sub-pixel configured to emit light of a second color, and a third sub-pixel configured to emit light of a third color; a gate driver configured to supply scan signals to the plurality of pixels; a data driver configured to supply data voltages to the plurality of pixels, the data voltages including a first data voltage having a first possible voltage range that is applied to the first sub-pixel, a second data voltage having a second possible voltage range that is applied to the second sub-pixel, and a third data voltage having a third possible voltage range that is applied to the second sub-pixel, wherein the first possible voltage range, the second possible voltage range, and the third possible voltage range are different from each other; and a luminance adjuster circuit configured to adjust a first emission time of the first sub-pixel during which the first sub-pixel emits light, a second emission time of the second sub-pixel during which the second sub-pixel emits light, and a third emission time of the third sub-pixel during which the third sub-pixel emits light to be different from each other.

According to an embodiment of the present disclosure, the data voltage at which the light emitting elements of each color are driven at their maximum luminous efficiency may be set independently for each color to reduce power consumption.

The present disclosure may appropriately reduce excess luminance for each color using color-specific emission signals and/or color-specific pixel driving voltages, thereby achieving ideal color coordinates and white balance. Accordingly, the present disclosure may improve the image quality of the display device.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
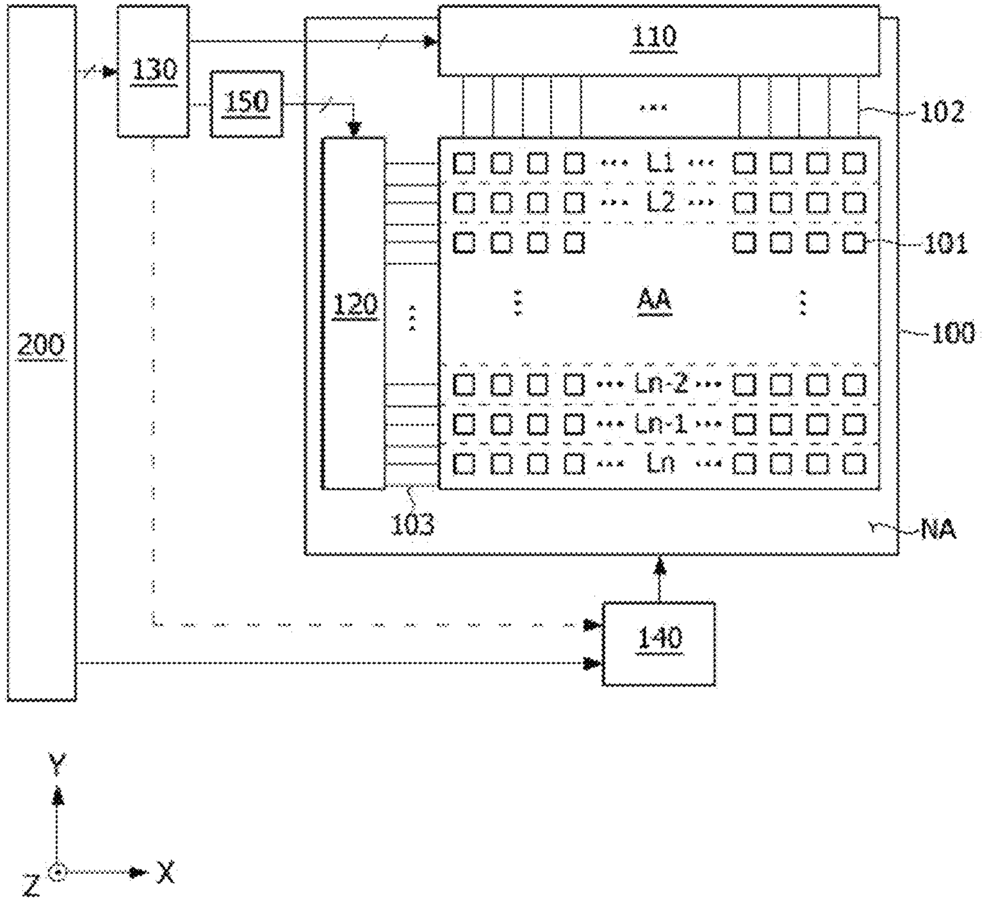
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit of the display device may include a plurality of transistors. A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Referring to FIG. 1, a display device according to one embodiment of the present disclosure includes a display panel 100, a display panel driving circuit for writing pixel data to pixels 101 of the display panel 100, and a power supply 140 that generates power required to drive the pixels 101 and the display panel driving circuit.

A substrate of the display panel 100 may be a plastic substrate, a thin glass substrate, or a metal substrate, but is not limited thereto. The display panel 100 may be a rectangular panel having a length in an X-axis direction (or a first direction), a width in a Y-axis direction (or a second direction), and a thickness in a Z-axis direction (or a third direction), but is not limited thereto. For example, at least a portion of the display panel 100 may have a curved perimeter.

The display panel 100 may be implemented as a non-transmissive display panel or a transmissive display panel. The transmissive display panel may be applied to a transparent display device in which an image is displayed on a screen and a real object is visible beyond the display panel. The display panel 100 may be manufactured as a flexible display panel. In addition, the display panel 100 may be manufactured as a stretchable panel that can extend.

A display area AA of the display panel 100 includes a pixel array that displays an input image. The pixel array includes a plurality of data lines 102, a plurality of gate lines 103 intersecting the data lines 102, and the pixels 101 arranged in a matrix form. The display panel 100 may further include power lines connected in common to the pixels 101. The power lines are connected in common to the pixels 101 to supply the pixels with a constant voltage required to drive the pixels 101. The power lines may be implemented as long stripe wires along the first direction or the second direction, or as mesh wires in which wires in the first direction and wires in the second direction are electrically connected.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light emitting element. The pixel circuits are connected to the data lines, the gate lines, and the power lines. Hereinafter, a "pixel" may be interpreted as a "sub-pixel".

The pixel array includes a plurality of pixel lines L1 to Ln. Each of the pixel lines L1 to Ln includes one line of pixels arranged along a gate line direction (the X-axis direction) in the pixel array of the display panel 100. Pixels arranged in the one pixel line may share the gate line 103. Pixels arranged in a column direction (the Y-axis direction) along a data line direction may share the same data line 102. One horizontal period is a time obtained by dividing one frame period by the total number of the pixel lines L1 to Ln.

The power supply 140 uses a DC-DC converter to generate a constant voltage (or a direct current (DC) voltage) required to drive the pixel array of the display panel 100 and the display panel driving circuit. The DC-DC converter may include a charge pump, a regulator, a buck converter, a boost converter, and the like. The power supply 140 may adjust the level of an input voltage inputted from a host system 200 to output constant voltages such as a gamma reference voltage, a gate low voltage, a gate high voltage, a pixel driving voltage, and a pixel base voltage. The gamma reference voltage is supplied to a data driver 110. The dynamic range of a data voltage outputted from the data driver 110 is determined by the voltage range of the gamma reference voltage. The dynamic range of the data voltage is a voltage range between the highest grayscale voltage and the lowest grayscale voltage.

The gate high voltage and the gate low voltage are supplied to a level shifter 150 and a gate driver 120. The constant voltages, such as the pixel driving voltage and the pixel base voltage, are supplied to the pixels 101 through the power lines connected in common to the pixels 101. The pixel driving voltage may be supplied to the display panel 100 from a main power source of the host system 200. In this case, the power supply 140 does not need to output the pixel driving voltage.

The display panel driving circuit writes pixel data of the input image to the pixels of the display panel 100 under the control of a timing controller 130. The display panel driving circuit includes the data driver 110 and the gate driver 120.

The display panel driving circuit may further include a touch sensor driver for driving touch sensors. The touch sensor driver is omitted in FIG. 1. The data driver 110 and the touch sensor driver may be integrated into a single drive integrated circuit (IC). The timing controller 130, the power supply 140, the level shifter 150, the data driver 110, the touch sensor driver, and the like may be further integrated into the drive IC.

The data driver 110 receives the pixel data of the input image received as a digital signal from the timing controller 130 and outputs the data voltage. The data driver 110 converts the pixel data of the input image into a gamma compensation voltage using a digital to analog converter (DAC) and outputs the data voltage. The gamma reference voltage is divided into gamma compensation voltages for each grayscale by a voltage divider circuit of the data driver 110 and supplied to the DAC. The DAC generates the data voltage with a gamma compensation voltage corresponding to a grayscale value of the pixel data. The data voltage outputted from the DAC is outputted to the data line 102 through an output buffer in each of data output channels of the data driver 110.

Data voltages may be different in the maximum luminous efficiency range of each of a red light emitting element, a green light emitting element, and a blue light emitting element. The data driver 110 may set differently at least one of the dynamic ranges, maximum voltages, and minimum voltages of a red data voltage supplied to a red sub-pixel, a green data voltage supplied to a green sub-pixel, and a blue data voltage supplied to a blue sub-pixel in order to drive each of the red light emitting element, the green light emitting element, and the blue light emitting element in the maximum luminous efficiency range.

The gate driver 120 may be formed on the display panel 100 along with a thin film transistor TFT array of the pixel array and wires. The gate driver 120 may be disposed in a non-display area NA outside the display area AA in the display panel 100, or may be at least partially disposed in the display area AA.

The gate driver 120 may be disposed in any one of the left non-display area NA and the right non-display area NA outside the display area AA in the display panel 100, and may supply a gate signal to the gate lines 103 in a single feeding manner. In the single feeding manner, the gate signal is applied through one end of the gate line 103. The gate driver 120 may be disposed in the left non-display area NA and the right non-display area NA of the display panel 100, and may apply a gate signal to the gate lines 103 in a double feeding manner. In the double feeding manner, the gate signal is applied simultaneously through both ends of the gate line 103. At least some circuits of the gate driver 120 may be disposed in the display area AA.

The gate driver 120 may include an edge trigger and/or a shift register that output and shift the pulse of the gate signal under the control of the timing controller 130. The gate signal may include a scan signal and an emission signal (hereinafter, an EM signal). In this case, the gate driver 120 may include a gate driver that outputs pulses of the scan signal and a gate driver that outputs pulses of the EM signal.

The timing controller 130 receives the pixel data of the input image from the host system 200, and a timing signal that is synchronized with the pixel data. The timing signal may include a vertical synchronization signal Vsync, a horizontal synchronization signal Hsync, a data enable signal DE, and the like. The vertical synchronization signal Vsync and the horizontal synchronization signal Hsync may be omitted since the vertical period and the horizontal period may be known by counting the data enable signal DE. The data enable signal DE has a cycle of one horizontal period 1H.

The timing controller 130 may control the operation timing of the data driver 110 and the gate driver 120 based on the timing signal Vsync, Hsync, and DE received from the host system 200. In addition, the timing controller 130 may control the output timing of the power supply 140. For example, the timing controller 130 may individually control, for each color of the sub-pixels, the application time of a pixel driving voltage VDD applied to the sub-pixels by using a power enable signal.

A gate timing control signal outputted from the timing controller 130 may be inputted to the shift register of the gate driver 120 through the level shifter 150. The level shifter 150 may receive the gate timing control signal, generate a clock, and output it to the gate driver 120. The input signal of the level shifter 150 is a signal of a digital signal voltage level. The clock outputted from the level shifter 150 may swing between the gate high voltage and the gate low voltage. A data timing control signal generated from the timing controller 130 is transmitted to the data driver 110. The power enable signal outputted from the timing controller 130 may adjust the application time of the pixel driving voltage VDD applied to the sub-pixels for each color.

The EM signal and/or the power enable signal generated for each color of the sub-pixels may individually control the power application times or the emission times of the sub-pixels for each color to optimize color coordinates and white balance of the pixels 101.

The host system 200 may scale an image signal from a video source to match the resolution of the display panel 100 and transmit it to the timing controller 130 together with the timing signal.

Figure 2A:
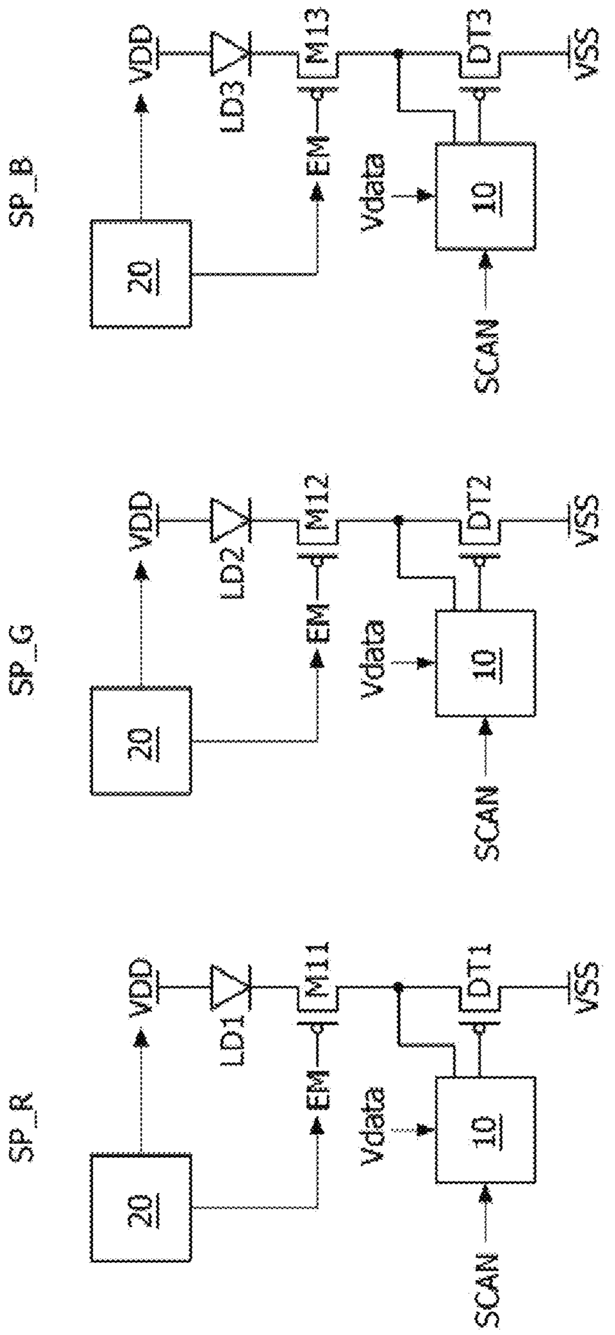
FIGS. 2A, 2B, and 2C are circuit diagrams schematically illustrating a pixel circuit according to one embodiment of the present disclosure.
Figure 2B:
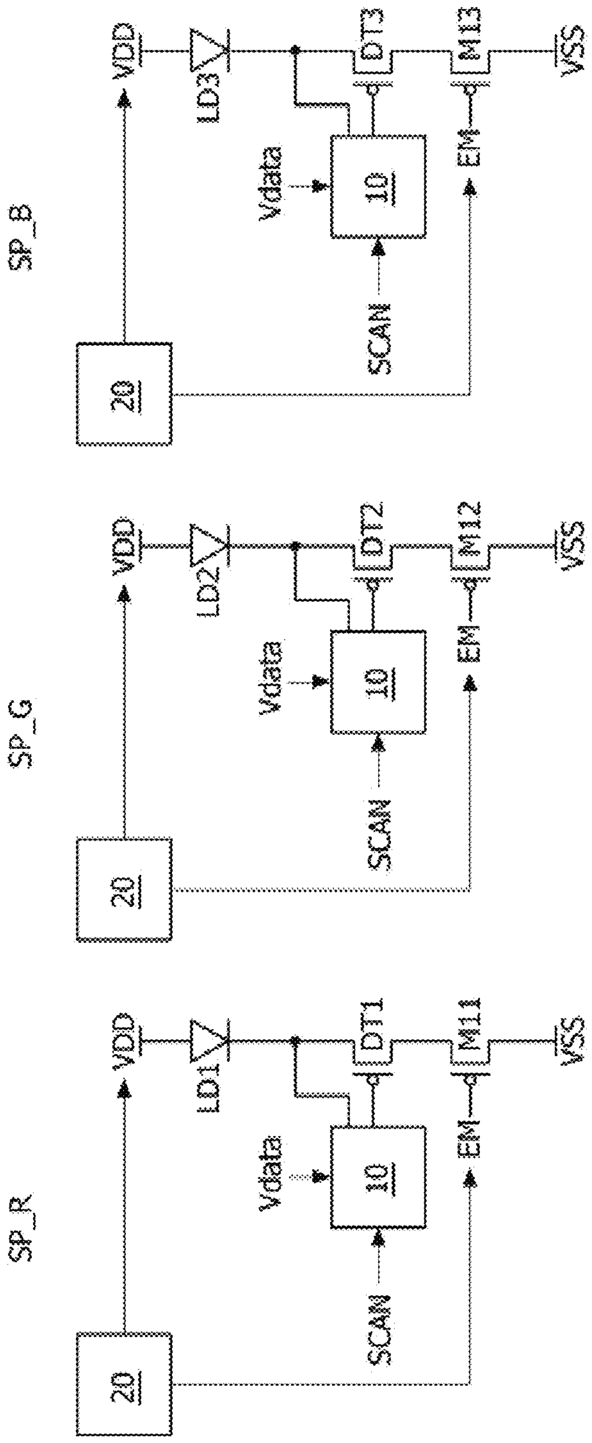
Figure 2C:
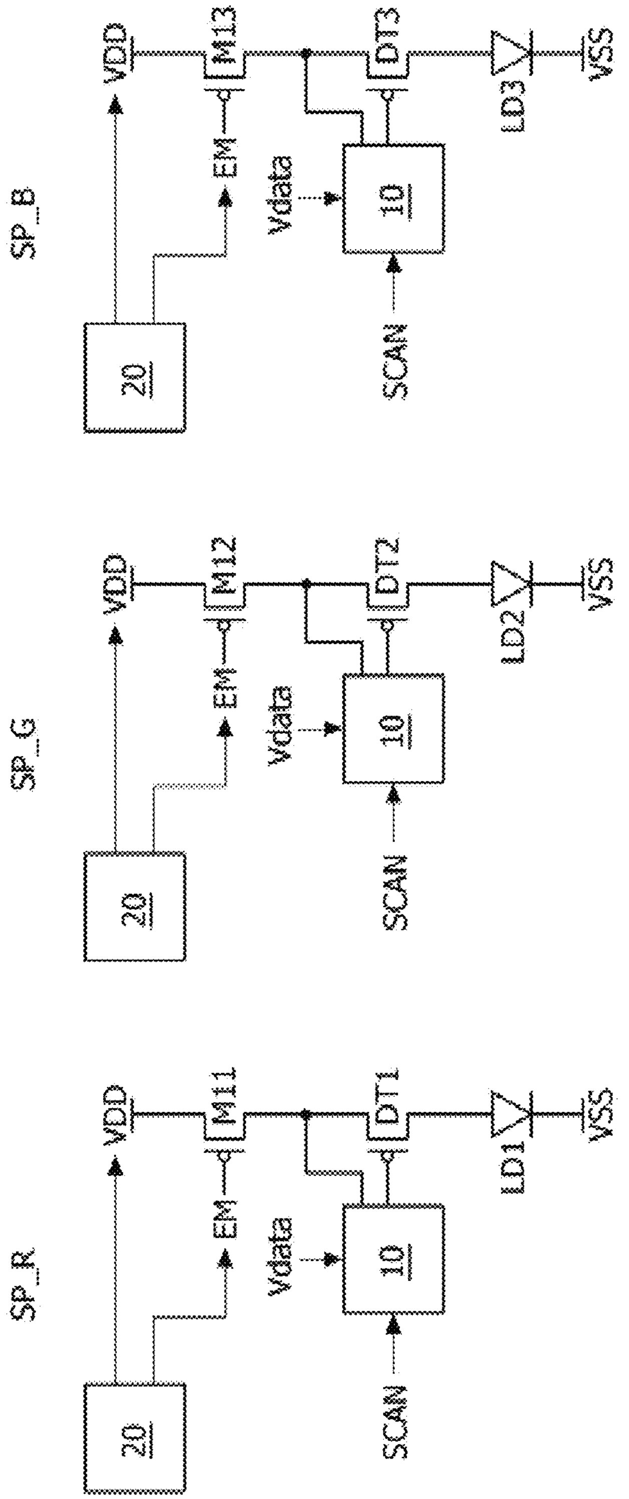

As shown in FIGS. 2A, 2B, and 2C, the display panel driving circuit may further include an excess luminance adjuster 20 (e.g., a circuit) for independently controlling the emission times of the light emitting elements for each color of the sub-pixels. The excess luminance adjuster 20 may output color-specific EM signals and/or color-specific pixel driving voltages under the control of the timing controller 130 to reduce excess luminance for each color that degrades color coordinates and luminance balance characteristics, thereby adjusting the color coordinates and luminance balance of the display device to ideal target values.

In a display device of the present disclosure, each of the pixels may include a first sub-pixel that receives a first data voltage to drive a first light emitting element, a second sub-pixel that receives a second data voltage to drive a second light emitting element, and a third sub-pixel that receives a third data voltage to drive a third light emitting element. At least one of the dynamic ranges, maximum voltages, and minimum voltages of the first data voltage, the second data voltage, and the third data voltage may be different from each other, and the emission time of the first light emitting element, the emission time of the second light emitting element, and the emission time of the third light emitting element may be different from each other within one frame period. Here, the first sub-pixel, the second sub-pixel, and the third sub-pixel may be a red sub-pixel, a green sub-pixel, and a blue sub-pixel, respectively, but are not limited thereto. Each of the first sub-pixel, the second sub-pixel, and the third sub-pixel may drive the light emitting element using the pixel circuit shown in FIGS. 2A, 2B, and 2C.

FIGS. 2A, 2B, and 2C are circuit diagrams schematically illustrating a pixel circuit according to one embodiment of the present disclosure.

Referring to FIGS. 2A, 2B, and 2C, the pixel circuits of a first sub-pixel SP_R, a second sub-pixel SP_G, and a third sub-pixel SP_B includes light emitting elements LD1, LD2, and LD3, driving elements DT1, DT2, and DT3, switch elements M11, M12, and M13, and compensation circuits 10, respectively. In FIGS. 2A, 2B, and 2C, the driving elements DT1, DT2, and DT3 and the switch elements M11, M12, and M13 are implemented as p-channel transistors, but are not limited thereto.

The light emitting elements LD1, LD2, and LD3 may be light emitting elements such as OLEDs or micro-LEDs, but are not limited thereto. In the case of the micro-LED, it may have a vertical structure in which electrodes are disposed on the top and bottom of a semiconductor chip in which the light emitting elements LD1, LD2, and LD3 are integrated, but is not limited thereto. The semiconductor chip in which the light emitting elements LD1, LD2, and LD3 are integrated may be implemented in a lateral structure or a flip-chip structure.

The light emitting elements LD1, LD2, and LD3 may include an anode electrode and a cathode electrode. As shown in FIG. 2A, the anode electrodes of the light emitting elements LD1, LD2, and LD3 may be connected to a VDD node to which the pixel driving voltage VDD is applied, and the cathode electrodes thereof may be connected to the first electrodes of the switch elements M11, M12, and M13. As shown in FIG. 2B, the anode electrodes of the light emitting elements LD1, LD2, and LD3 may be connected to the VDD node to which the pixel driving voltage VDD is applied, and the cathode electrodes thereof may be connected to the first electrodes of the driving elements DT1, DT2, and DT3. As shown in FIG. 2C, the anode electrodes of the light emitting elements LD1, LD2, and LD3 may be connected to the second electrodes of the driving elements DT1, DT2, and DT3, and the cathode electrodes thereof may be connected to a VSS node to which a pixel base voltage VSS is applied.

The light emitting elements LD1, LD2, and LD3, the driving elements DT1, DT2, and DT3, and the switch elements M11, M12, and M13 may be connected in series between the VDD node and the VSS node.

The driving elements DT1, DT2, and DT3 drive the light emitting elements LD1, LD2, and LD3 by adjusting a current flowing through the light emitting elements LD1, LD2, and LD3 based on their gate-source voltages. The gate-source voltages of the driving elements DT1, DT2, and DT3 are varied depending on a data voltage Vdata of the pixel data applied to the gate electrodes of the driving elements DT1, DT2, and DT3. The light emitting elements LD1, LD2, and LD3 may be driven by a current from the driving elements DT1, DT2, and DT3 to emit light. The driving elements DT1, DT2, and DT3 include the gate electrode, the first electrode, and the second electrode. The gate electrodes and the first electrodes of the driving elements DT1, DT2, and DT3 may be connected to the compensation circuit 10. The first electrodes of the driving elements DT1, DT2, and DT3 may be connected to the second electrodes of the switch elements M11, M12, and M13 as shown in FIGS. 2A and 2C, or to the cathode electrodes of the light emitting elements LD1, LD2, and LD3 as shown in FIG. 2B. The second electrodes of the driving elements DT1, DT2, and DT3 may be connected to the VSS node as shown in FIG. 2A, or to the first electrodes of the switch elements M11, M12, and M13 as shown in FIG. 2B, or to the anode electrodes of the light emitting elements LD1, LD2, and LD3 as shown in FIG. 2C.

The switch elements M11, M12, and M13 switch the current paths of the light emitting elements LD1, LD2, and LD3 between the pixel driving voltage VDD and the pixel base voltage VSS in response to an EM signal EM. Each of the switch elements M11, M12, and M13 includes a gate electrode, the first electrode, and the second electrode. The EM signal EM is applied to the gate electrodes of the switch elements M11, M12, and M13. The EM signal EM may be outputted from the excess luminance adjuster 20 or may be outputted through a separate switch circuit. The first electrodes of the switch elements M11, M12, and M13 may be connected to the cathode electrodes of the light emitting elements LD1, LD2, and LD3 as shown in FIG. 2A, or to the second electrodes of the driving elements DT1, DT2, and DT3 as shown in FIG. 2B, or to the VDD node as shown in FIG. 2C. The second electrodes of the switch elements M11, M12, and M13 may be connected to the first electrodes of the driving elements DT1, DT2, and DT3 as shown in FIGS. 2A and 2C, or to the VSS node as shown in FIG. 2B.

The compensation circuit 10 may include a plurality of switch elements and a capacitor. The compensation circuit 10 receives the data voltage Vdata of the pixel data and a scan signal SCAN, and applies the data voltage Vdata to the gate electrodes of the driving elements DT1, DT2, and DT3. The compensation circuit 10 may include an internal compensation circuit or an external compensation circuit. The internal compensation circuit samples the threshold voltages of the driving elements DT1, DT2, and DT3 and compensates the gate voltages of the driving elements DT1, DT2, and DT3 by the threshold voltages. The external compensation circuit may compensate for deviations or changes in the threshold voltages of the driving elements DT1, DT2, and DT3 by modulating the pixel data of the input image in the timing controller 130 based on the result of sensing the first electrode voltages of the driving elements DT1, DT2, and DT3.

The red light emitting element, the green light emitting element, and the blue light emitting element may emit light of different wavelengths and may have different maximum efficiency ranges. Under the control of the timing controller 130, the excess luminance adjuster 20 may output the color-specific EM signals and/or the color-specific pixel driving voltages to reduce one or more excess luminances for each color. The excess luminance adjuster 20 may include an emission signal output circuit and/or a pixel driving voltage output circuit.

Figure 3:
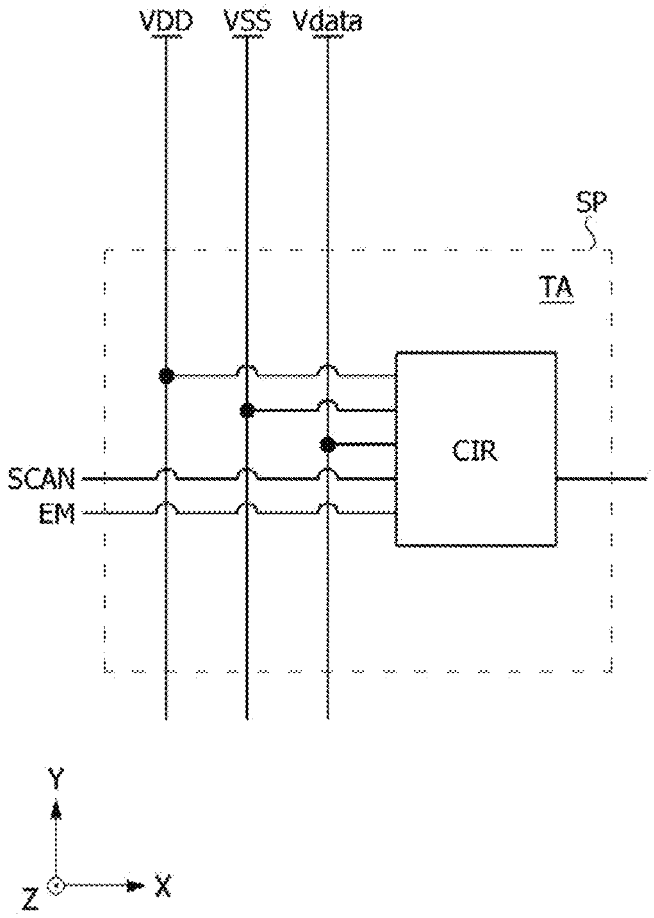
FIG. 3 is a diagram schematically illustrating a sub-pixel structure of a transparent display device.

FIG. 3 is a diagram schematically illustrating a sub-pixel structure of a transparent display device.

Referring to FIG. 3, a sub-pixel SP of the transparent display device includes the pixel circuit and a light emitting portion CIR and a transmitting portion TA.

The pixel circuit and the light emitting portion CIR includes a circuit region in which the pixel circuit and the light emitting element are disposed, and an emission region of the light emitting element. The pixel circuit may be connected to the data line through which the data voltage Vdata is applied, the gate line through which the scan signal SCAN is applied, an EM line through which the EM signal EM is applied, and the power lines through which the pixel driving voltage VDD and the pixel base voltage VSS are individually applied.

The transmitting portion TA is a transparent area through which light passes without metal wiring that blocks light. The transmitting portion TA may be approximately 50% to 80% of the total area of the sub-pixel SP, but is not limited thereto. The real object may be seen beyond the display panel 100 through the transmitting portion TA.

Figure 4:
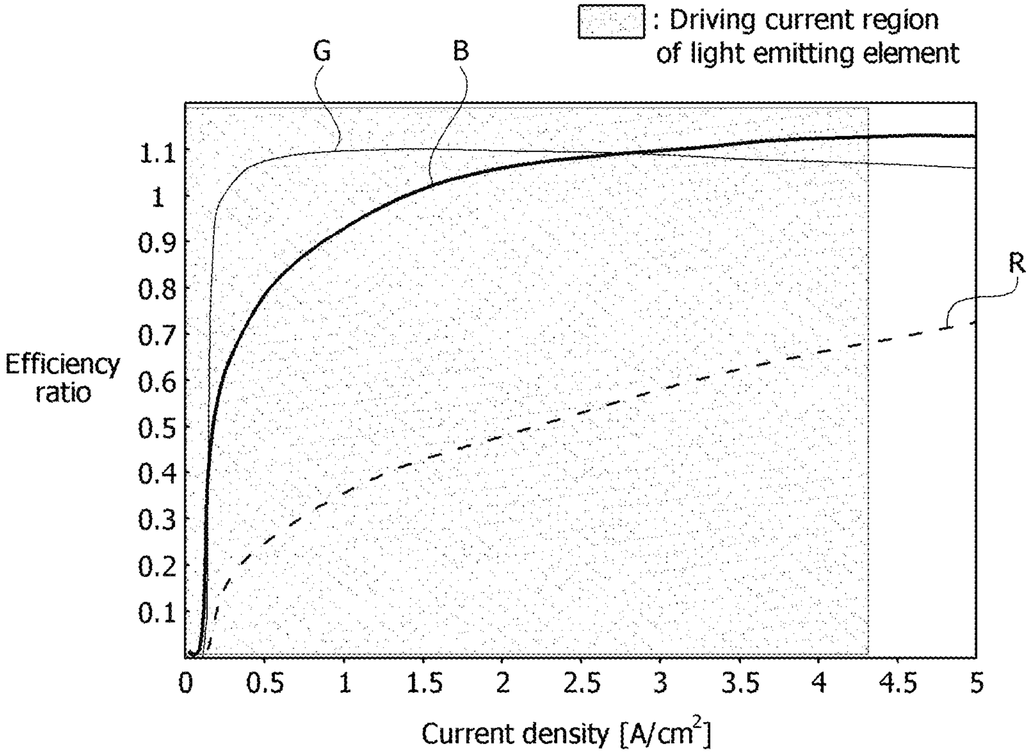
FIG. 4 is a graph illustrating an example of a current density versus efficiency ratio characteristic of a light emitting element for each color.

FIG. 4 is a graph illustrating a current density versus efficiency ratio characteristic of a light emitting element for each color. In FIG. 4, the horizontal axis represents the current density ($A/cm^2$) and the vertical axis represents a light emitting element efficiency ratio of each color relative to a reference efficiency when the reference efficiency is 1. The ratio of the current density to the efficiency of the light emitting element for each color shown in FIG. 4 is a normalization value. As shown in FIG. 4, a red light emitting element R, a green light emitting element G, and a blue light emitting element B may have different maximum luminous efficiency ranges. The data voltage Vdata may be set as shown in FIG. 5 such that the driving current region of each of the light emitting elements R, G, and B for each color include the maximum luminous efficiency range.

Figure 5:
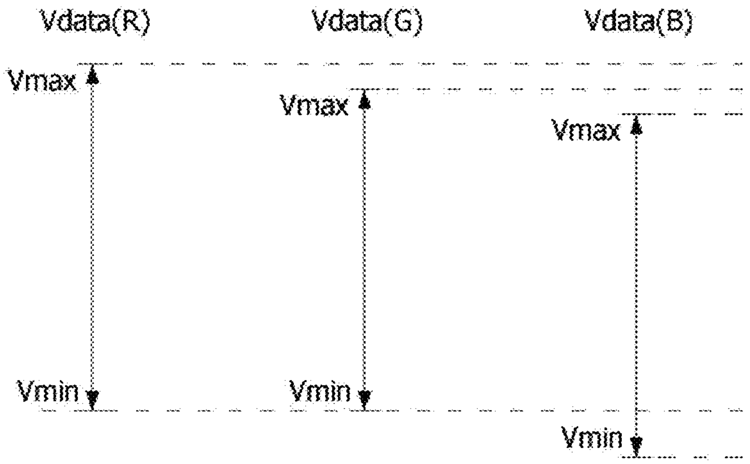
FIG. 5 is a diagram illustrating an example of a data voltage for each color according to one embodiment of the present disclosure.

FIG. 5 is a diagram illustrating an example of a data voltage for each color according to one embodiment of the present disclosure.

Referring to FIG. 5, the data voltage Vdata of each color has a dynamic range between a minimum voltage Vmin (e.g., a minimum possible voltage in the dynamic range) and a maximum voltage Vmax (e.g., a maximum possible voltage in the dynamic range). Within the dynamic range of each data voltage Vdata, the data voltage corresponding to a grayscale value of the pixel data may be outputted from the data driver 110 and applied to the gate electrode of the driving element. In the case of the p-channel transistor-based pixel circuit shown in FIGS. 2A, 2B, and 2C, the minimum voltage Vmin of the data voltage Vdata is a white grayscale voltage at which the luminance of the sub-pixel is highest, and the maximum voltage Vmax of the data voltage Vdata is a black grayscale voltage at which the light emitting element does not emit light.

The maximum voltage Vmax of a red data voltage Vdata (R) may be higher than the maximum voltage Vmax of each of a green data voltage Vdata(G) and a blue data voltage Vdata(B). The maximum voltage Vmax of the green data voltage Vdata(G) may be higher than the maximum voltage Vmax of the blue data voltage Vdata(B). The minimum voltage Vmin of the red data voltage Vdata(R) may be equal to or similar to the minimum voltage Vmin of the green data voltage Vdata(G), and may be higher than the minimum voltage Vmin of the blue data voltage Vdata(B). The minimum voltage Vmin of the blue data voltage Vdata(B) may be lower than the minimum voltage Vmin of each of the red data voltage Vdata(R) and the green data voltage Vdata(G).

The data voltage for each color of the present disclosure is not limited to FIG. 5. For example, depending on the material characteristics of the light emitting element or the chip characteristics, the maximum luminous efficiency range of the light emitting elements may differ from that of FIG. 4. Hereinafter, the description will focus on embodiments in which an excess luminance value for each color caused by an increase in the data voltage when the data voltage is set as shown in FIG. 5 is reduced using the color-specific EM signal and/or the color-specific pixel driving voltage in order to enable the light emitting element to operate in the maximum luminous efficiency range in the sub-pixels of each color, but the present disclosure is not limited thereto. In the following embodiments, the red sub-pixel, the green sub-pixel, and the blue sub-pixel may be interpreted as the first sub-pixel, the second sub-pixel, and the third sub-pixel, respectively.

When the data voltage Vdata is increased to use the maximum luminous efficiency range of the light emitting element LD in each color, the luminance in a specific color may increase excessively, causing the color coordinates and white balance to deviate from the target values. In the present disclosure, the emission time may be controlled independently for each color such that the light emitting element LD operates in the maximum luminous efficiency range in each color and the color coordinates and white balance meet the target values.

Figure 6:
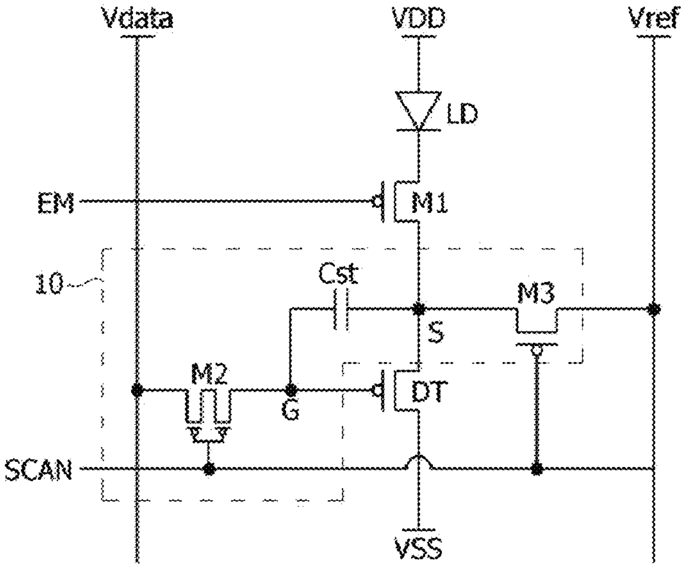
FIG. 6 is a detailed circuit diagram illustrating a pixel circuit according to one embodiment of the present disclosure.

FIG. 6 is a circuit diagram illustrating a pixel circuit according to one embodiment of the present disclosure. As shown in FIGS. 2A, 2B, and 2C, the pixel circuit of the present disclosure is not limited to FIG. 6.

Referring to FIG. 6, each of the red sub-pixel, the green sub-pixel, and the blue sub-pixel includes a pixel circuit. The pixel circuit includes the light emitting element LD, a driving element DT that drives the light emitting element LD, and the compensation circuit 10. The driving element DT and switch elements M1, M2, and M3 may be implemented as p-channel transistors, but are not limited thereto.

The pixel circuit is connected to the data line through which the data voltage Vdata is applied, the gate line through which the scan signal SCAN is applied, and constant voltage nodes to which direct current voltages (or constant voltages) are applied, such as the VDD node (e.g., a first node) to which the pixel driving voltage VDD is applied, the VSS node (e.g., a second node) to which the pixel base voltage VSS is applied, and a REF node to which a reference voltage Vref is applied. The constant voltage nodes are connected to the power lines disposed on the display panel 100, and the power lines may be connected in common to all pixels.

The data voltage Vdata may be selected from a voltage range of 0 V to 16 V. At least one of the maximum voltage, minimum voltage, and dynamic range of the data voltage Vdata may be set to be different from each other for each color of the sub-pixels such that the light emitting element of the corresponding color can be driven at maximum luminous efficiency. The reference voltage Vref may be a voltage selected from a voltage range of 7 V to 11 V. The pixel driving voltage VDD may be a voltage selected from a voltage range of 6 V to 12 V, and the pixel base voltage VSS may be 0 V, but the present disclosure is not limited thereto. A gate high voltage VGH of the scan signal SCAN and the EM signal EM may be a voltage selected from 12 V to 20 V, and a gate low voltage VGL thereof may be a voltage selected from −19 V to −12 V, but they are not limited thereto. Hereinafter, "VGL" is referred to as a gate-on voltage and "VGH" is referred to as a gate-off voltage. However, in some embodiments, a gate high voltage VGH may be used as the gate-on voltage, and the gate low voltage VGL may be used as the gate-off voltage.

The driving element DT includes a first electrode connected to a first node S, a gate electrode connected to a second node G, and a second electrode connected to the VSS node. The light emitting element LD includes an anode electrode connected to the VDD node, and a cathode electrode connected to the first electrode of a first switch element M1. A storage capacitor Cst is connected between the first node S and the second node G to charge the gate-source voltage of the driving element DT.

The first switch element M1 is turned on in response to the gate-on voltage VGL of the EM signal EM. When the first switch element M1 is turned on, a current path may be electrically connected between the light emitting element LD and the driving element DT, so that a current flows through the light emitting element LD, thereby allowing the light emitting element LD to emit light. The first switch element M1 includes the first electrode connected to the cathode electrode of the light emitting element LD, a gate electrode connected to the EM line through which the EM signal EM is applied, and a second electrode connected to the first node S.

A second switch element M2 is connected between the data line through which the data voltage Vdata is applied and the second node G and is turned on in response to the gate-on voltage VGL of the scan signal SCAN. When the second switch element M2 is turned on, the data voltage Vdata is applied to the second node G. The second switch element M2 includes a first electrode connected to the data line, a second electrode connected to the second node G, and a gate electrode connected to the gate line through which the scan signal SCAN is applied. The second switch element M2 may be implemented in a dual gate structure with two transistors connected in series to reduce a leakage current, but is not limited thereto.

The third switch element M3 is connected between the REF node to which the reference voltage Vref is applied and the first node S, and is turned on in response to the gate-on voltage VGL of the scan signal SCAN. When the third switch element M3 is turned on, the reference voltage Vref is applied to the first node S. The third switch element M3 includes a first electrode connected to the REF node, a second electrode connected to the first node S, and a gate electrode connected to the gate line through which the scan signal SCAN is applied.

Figure 7:
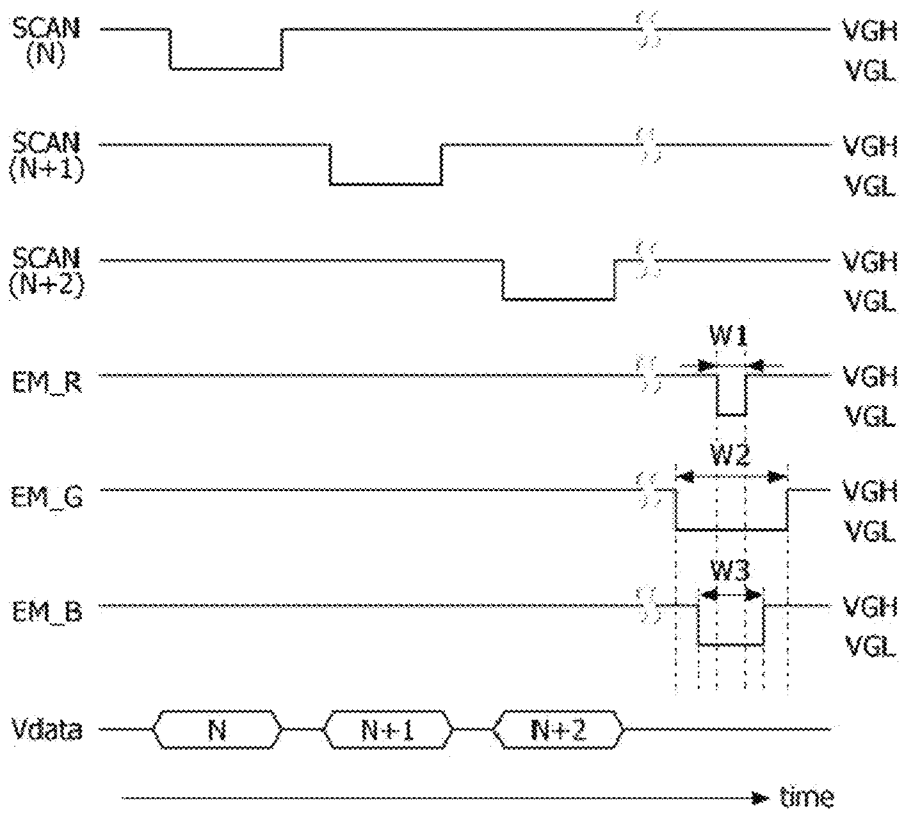
FIG. 7 is a waveform diagram illustrating a signal applied to a pixel circuit according to embodiments of the present disclosure.

FIG. 7 is a waveform diagram illustrating a signal applied to a pixel circuit according to embodiments of the present disclosure.

Referring to FIG. 7, scan signals SCAN(N) to SCAN(N+2) include pulses of the scan signals applied sequentially to $N^{th}$ (where Nis a natural number) to $(N+1)^{th}$ pixel lines. The pulses of the scan signals SCAN(N) to SCAN(N+2) swing between the gate-on voltage VGL and the gate-off voltage VGH and are synchronized with data voltages Vdata(N) to Vdata(N+2). When the pulses of the data voltages Vdata(N) to Vdata(N+2) and the scan signals SCAN(N) to SCAN(N+2) are simultaneously applied, the data voltage Vdata of the pixel data is applied to the sub-pixels of the corresponding pixel line so that the sub-pixels are programmed. Programming may be interpreted as scanning or data addressing. During one horizontal period, all sub-pixels of one pixel line are programmed, and during one frame period, the sub-pixels of all pixel lines L1 to Ln of the display area may be programmed sequentially on a line basis.

The EM signal EM includes a first EM signal EM_R, a second EM signal EM_G, and a third EM signal EM_B. Each of the first EM signal EM_R, the second EM signal EM_G, and the third EM signal EM_B includes the pulse of the gate-on voltage VGL applied to the sub-pixels after the sub-pixels of all pixel lines L1 to Ln of the display area AA are programmed.

The pulse of the first EM signal EM_R is applied to the first switch element M1 of the red sub-pixel to control the emission time of the red sub-pixel. The pulse of the second EM signal EM_G is applied to the first switch element M1 of the green sub-pixel to control the emission time of the green sub-pixel. The pulse of the third EM signal EM_B is applied to the first switch element M1 of the blue sub-pixel to control the emission time of the blue sub-pixel. The pulse widths of the second EM signal EM_G and the third EM signal EM_B are different from each other. The pulse width may be interpreted as the duration of the gate-on voltage. For example, within one frame period, a pulse width W1 of the first EM signal EM_R may be smaller than pulse widths W2 and W3 of the second and third EM signals EM_G and EM_B. The pulse width W2 of the second EM signal EM_G may be larger than the pulse widths W1 and W3 of the first and third EM signals EM_R and EM_B. The pulse width W3 of the third EM signal EM_B may be larger than the pulse width W1 of the first EM signal EM_R and smaller than the pulse width W2 of the second EM signal EM_G. In this case, in each frame period, among the red sub-pixel, the green sub-pixel, and the blue sub-pixel, the emission time of the red sub-pixel may be the shortest and the emission time of the green sub-pixel may be the longest.

Figure 8:
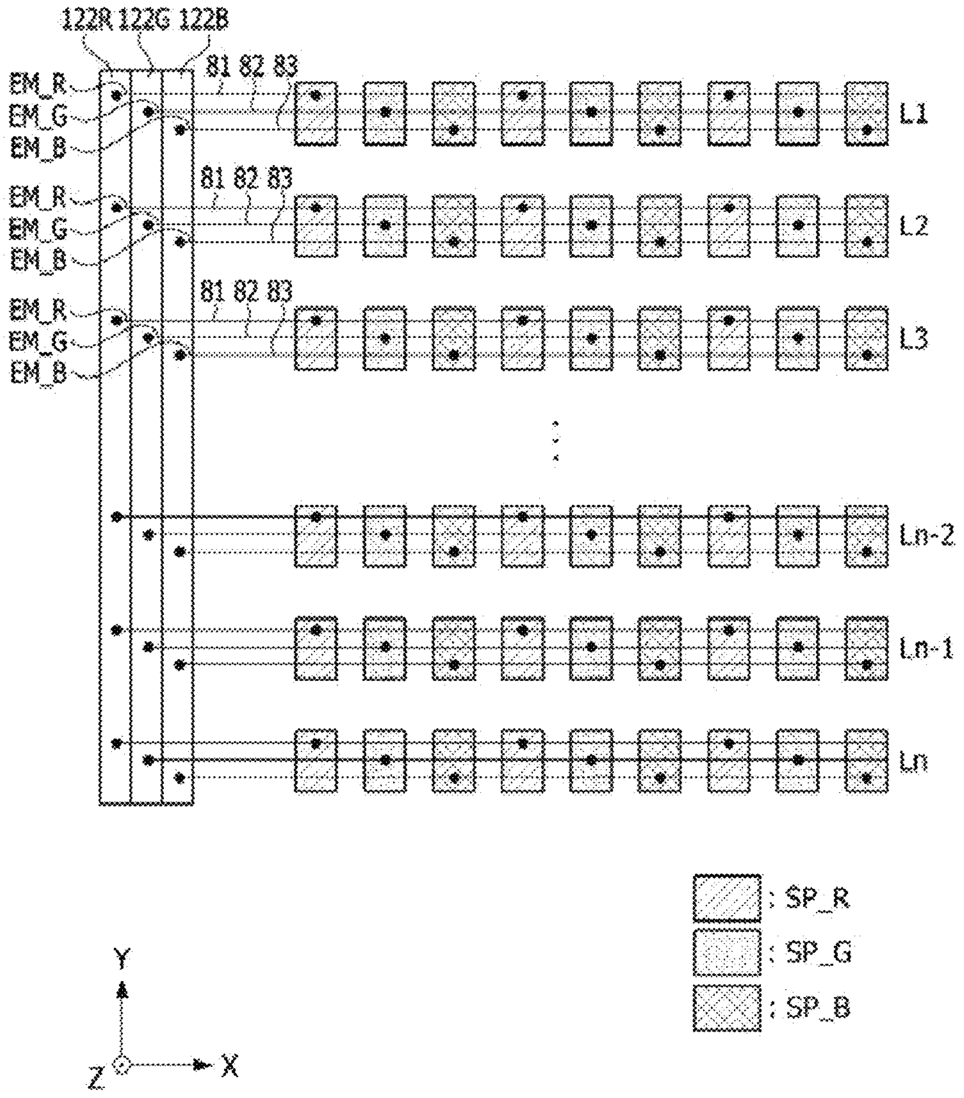
FIG. 8 is a diagram illustrating an emission signal output circuit according to one embodiment of the present disclosure.

FIG. 8 is a diagram illustrating an emission signal output circuit according to one embodiment of the present disclosure.

Referring to FIG. 8, the gate driver 120 may include a first EM driver 122R that outputs the first EM signal EM_R, a second EM driver 122G that outputs the second EM signal EM_G, and a third EM driver 122B that outputs the third EM signal EM_G.

The first EM driver 122R may output the first EM signal EM_R to first EM lines 81 connected to the red sub-pixels SP_R while shifting the pulse of the first EM signal EM_R. The first EM lines 81, one in each of the pixel lines L1 to Ln, may be arranged in a direction (the X-axis direction) parallel to the gate line. The second EM driver 122G may output the second EM signal EM_G to second EM lines 82 connected to the green sub-pixels SP_G while shifting the pulse of the second EM signal EM_G. The second EM lines 82, one in each of the pixel lines L1 to Ln, may be arranged in a direction parallel to the gate line. The third EM driver 122B may output the third EM signal EM_B to third EM lines 83 connected to the blue sub-pixels SP_B while shifting the pulse of the third EM signal EM_B. The third EM lines 83, one in each of the pixel lines L1 to Ln, may be arranged in a direction parallel to the gate line.

Figure 9:
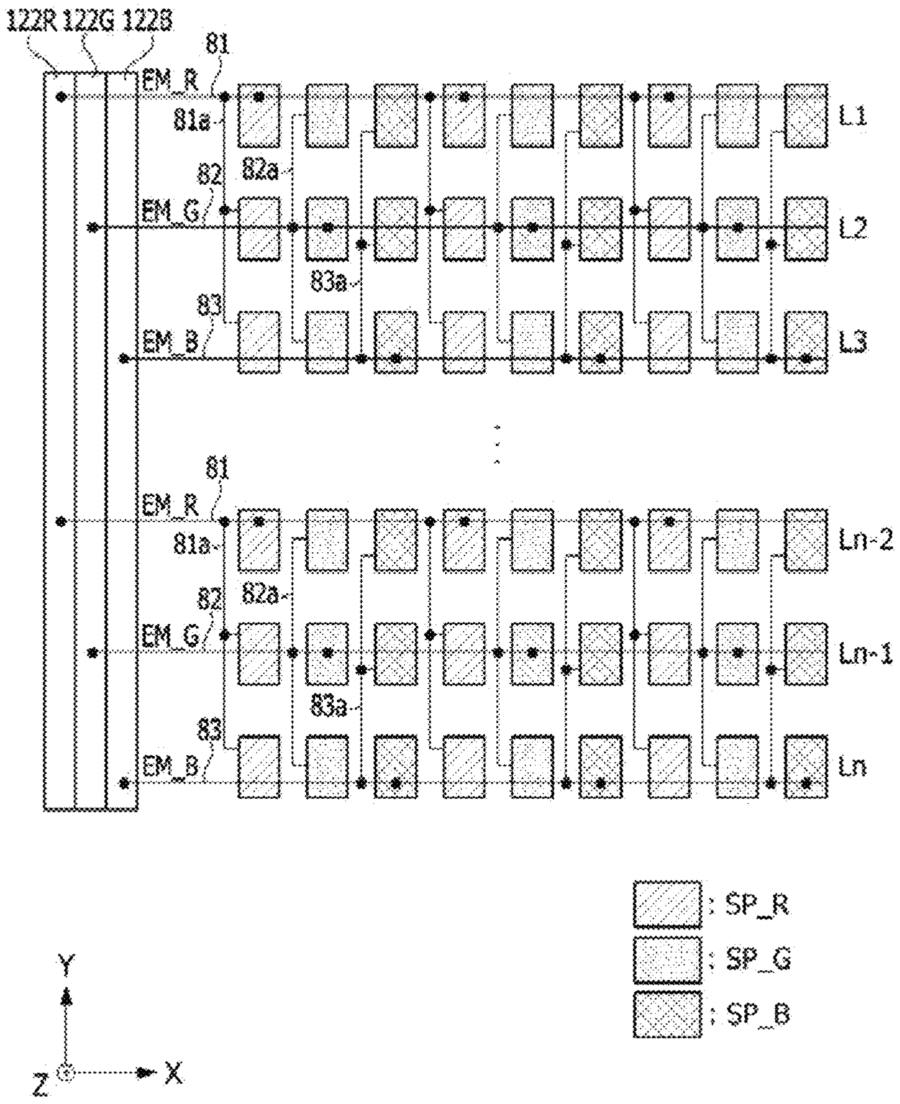
FIG. 9 is a diagram illustrating an emission signal output circuit according to another embodiment of the present disclosure.

FIG. 9 is a diagram illustrating an emission signal output circuit according to another embodiment of the present disclosure. In this embodiment, compared to the embodiment shown in FIG. 8, the number of wires through which the EM signal is applied in the display area AA may be reduced, thereby improving an aperture ratio of the pixel and further increasing transparency in a transparent display device. In FIG. 9, substantially the same components as those in the embodiment shown in FIG. 8 described above are designated by the same reference numerals, and redundant descriptions thereof are omitted.

Referring to FIG. 9, the first EM lines 81 include branch lines 81*a*. One or more branch lines 81*a* are branched from each of the first EM lines 81 and disposed in a direction (the Y-axis direction) parallel to the data line. Each of the first EM lines 81 may be connected to the red sub-pixels SP_R arranged on a plurality of pixel lines, e.g., three pixel lines L1, L2, and L3, through the branch line 81*a* to simultaneously supply the first EM signal EM_R to the red sub-pixels SP_R of the pixel lines L1, L2, and L3. That is, the first EM driver 122R simultaneously applies the first EM signal EM_R to red sub-pixels SPR_R that are on different pixel lines. Accordingly, the number of channels of the first EM driver 122R and the number of first EM lines 81 may be reduced.

The second EM lines 82 include branch lines 82*a*. One or more branch lines 82*a* are branched from each of the second EM lines 82 and disposed in a direction (the Y-axis direction) parallel to the data line. Each of the second EM lines 82 may be connected to the green sub-pixels SP_G disposed on a plurality of pixel lines, e.g., three pixel lines L1, L2, and L3, through the branch line 82*a*. Thus, the second EM driver 122G simultaneously applies the second EM signal EM_G to greed sub-pixels SPR_G that are on different pixel lines. Accordingly, the number of channels of the second EM driver 122G and the number of second EM lines 82 may be reduced.

The third EM lines 83 include branch lines 83*a*. One or more branch lines 83*a* are branched from each of the third EM lines 83 and disposed in a direction (the Y-axis direction) parallel to the data line. Each of the third EM lines 83 may be connected to the blue sub-pixels SP_B disposed on a plurality of pixel lines, e.g., three pixel lines L1, L2, and L3, through the branch line 83*a*. Thus, the third EM driver 122B simultaneously applies the third EM signal EM_B to blue sub-pixels SPR_B that are on different pixel lines. Accordingly, the number of channels of the third EM driver 122B and the number of third EM lines 83 may be reduced.

Figure 10:
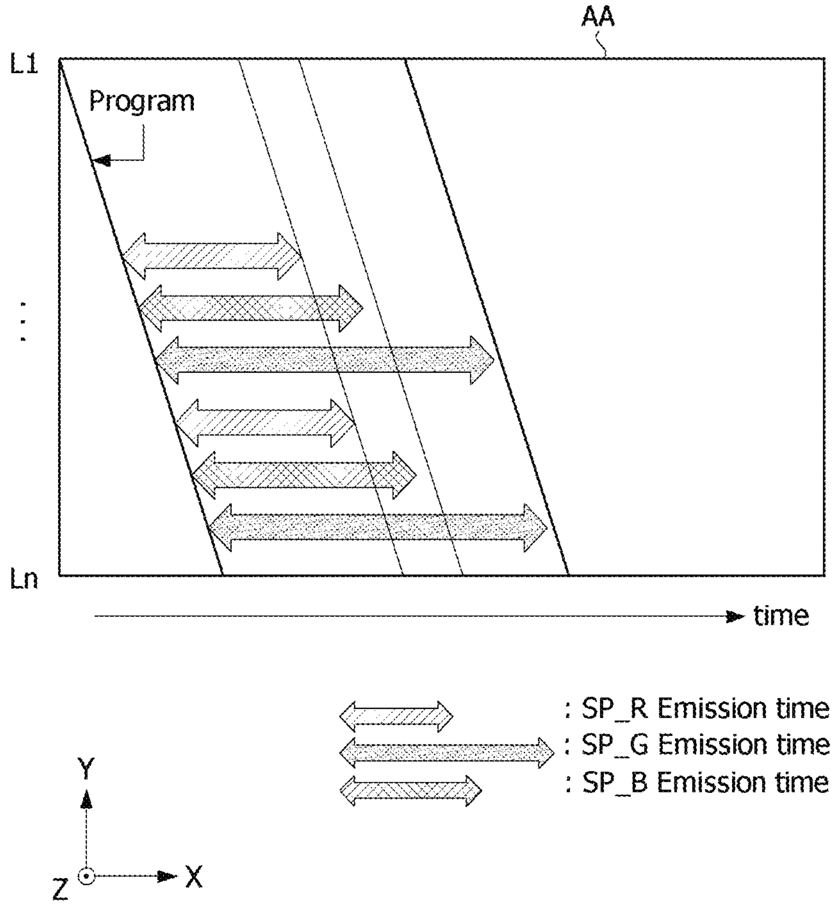
FIG. 10 is a diagram illustrating an example of emission times for each color of sub-pixels.

FIG. 10 is a diagram illustrating an example of emission times for each color of sub-pixels.

Referring to FIG. 10, the EM signals EM_R, EM_G, and EM_B for each color may independently control the emission times for each color of the sub-pixels SP_R, SP_G, and SP_B.

When the data voltage is increased to drive each of the red light emitting element, the green light emitting element, and the blue light emitting element at maximum driving efficiency, the EM signals EM_R, EM_G, and EM_B may reduce excess luminance values for each color using the emission time to adjust the color coordinates and white balance of the display device to the ideal target values. For example, in the red sub-pixel SP_R, the luminance of the red sub-pixel may become excessively high when the data voltage Vdata is increased as shown in FIG. 5 to drive the red light emitting element at the maximum luminous efficiency. In this case, the pulse width of the first EM signal EM_R may be set smaller than those of the other EM signals EM_G and EM_B, so that the emission time of the red light emitting element may be reduced compared to the emission times of the light emitting elements of other colors.

Figure 11:
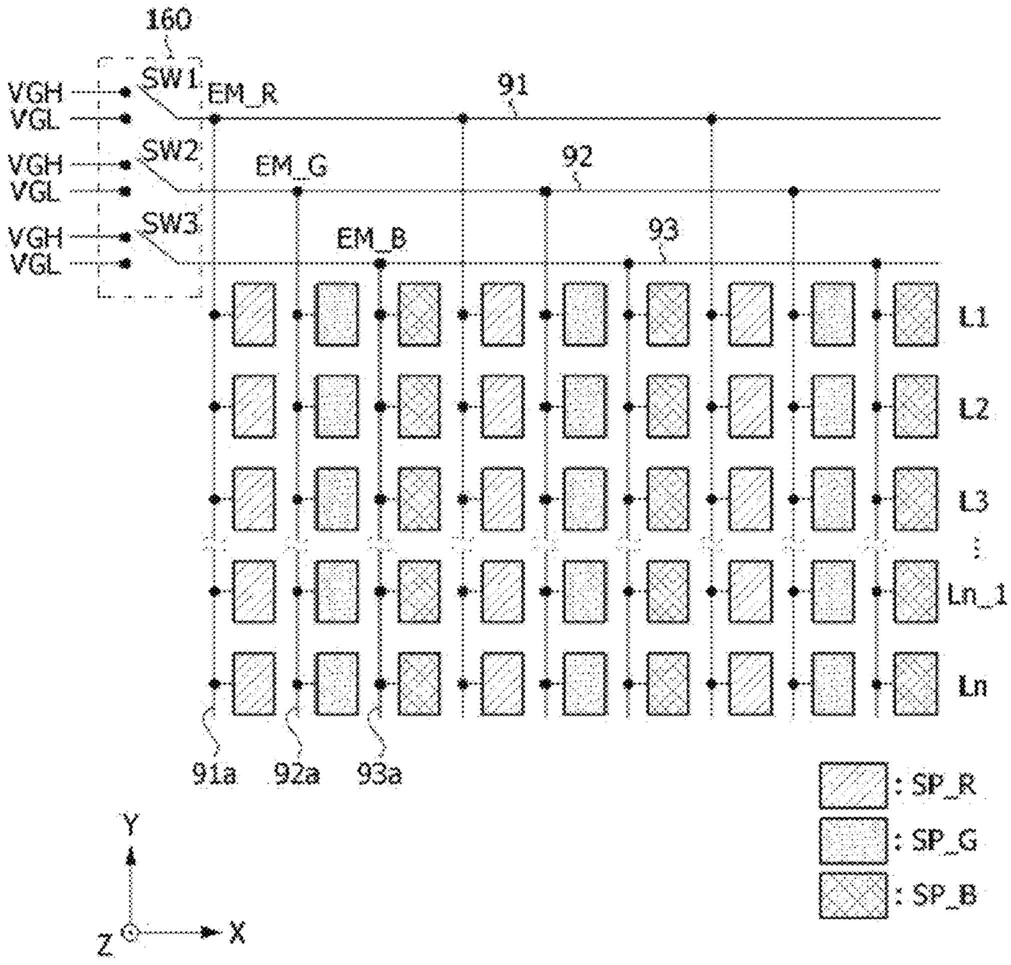
FIG. 11 is a diagram illustrating an emission signal output circuit according to another embodiment of the present disclosure.

FIG. 11 is a diagram illustrating an emission signal output circuit according to still another embodiment of the present disclosure.

Referring to FIG. 11, the display device of the present disclosure may further include a switch circuit 160 that outputs the EM signal for each color.

The switch circuit 160 outputs the EM signals EM_R, EM_G, and EM_B for independently adjusting the emission times of the sub-pixels SP_R, SP_G, and SP_B for each color under the control of the timing controller 130. The switch circuit 160 includes a first switch element SW1 that outputs the first EM signal EM_R through an output terminal of a first channel, a second switch element SW2 that outputs the second EM signal EM_G through an output terminal of a second channel, and a third switch element SW3 that outputs the third EM signal EM_B through an output terminal of a third channel. Each of the switch elements SW1, SW2, and SW3 may be turned on/off under the control of the timing controller 130 to supply the gate-on voltage VGL and the gate-off voltage VGH to corresponding EM lines 91, 92, and 93 to output the EM signals EM_R, EM_G, and EM_B. The switch elements SW1, SW2, and SW3 may each be implemented as one or more transistors or multiplexers.

The EM lines 91, 92, and 93 may be disposed in the non-display area NA of the display panel 100 in a direction (the X-axis direction) parallel to the gate line. The EM lines 91, 92, and 93 may include branch lines 91*a*, 92*a*, and 93*a*, respectively. One or more first branch lines 91*a* are branched from a first EM line 91 and extend in a direction (Y-axis direction) parallel to the data line to be connected to the red sub-pixels SP_R of the display area AA. One or more second branch lines 92*a* are branched from a second EM line 92 and extend in a direction (Y-axis direction) parallel to the data line to be connected to the green sub-pixels SP_G of the display area AA. One or more third branch lines 93*a* are branched from a third EM line 93 and extend in a direction (Y-axis direction) parallel to the data line to be connected to the blue sub-pixels SP_B of the display area AA.

The first switch element SW1 outputs the pulse of the first EM signal EM_R to the first EM line 91 connected to the red sub-pixels SP_R. The first EM signal EM_R may be applied to the red sub-pixels SP_R on different pixel lines through the first branch line 91*a* to adjust the emission time of the red light emitting element according to its pulse width. The second switch element SW2 outputs the pulse of the second EM signal EM_G to the second EM line 92 connected to the green sub-pixels SP_G. The second EM signal EM_G may be applied to the green sub-pixels SP_G on different pixel lines through the second branch line 92*a* to adjust the emission time of the green light emitting element according to its pulse width. The third switch element SW3 outputs the pulse of the third EM signal EM_B to the third EM line 93 connected to the blue sub-pixels SP_B. The third EM signal EM_B may be applied to the blue sub-pixels SP_B on different pixel lines through the third branch line 93*a* to adjust the emission time of the blue light emitting element according to its pulse width.

Figure 12:
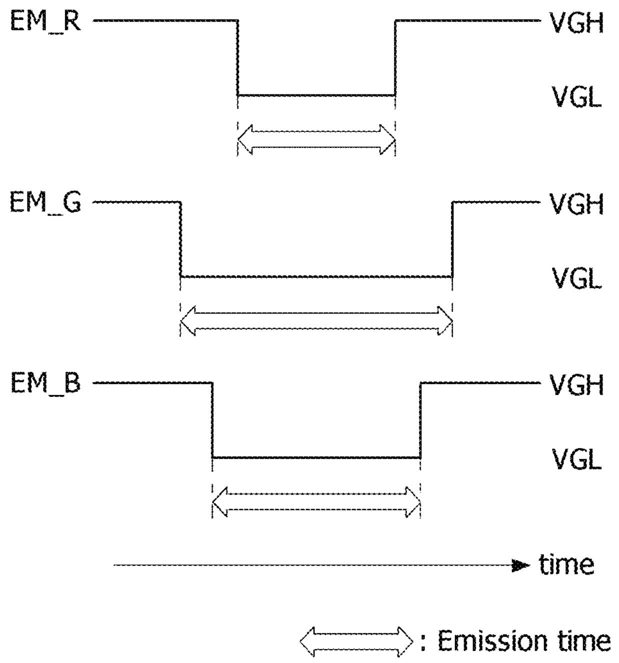
FIG. 12 is a waveform diagram illustrating an example of an emission signal for each color outputted from the emission signal output circuit shown in FIG. 11 according to one embodiment of the present disclosure.

FIG. 12 is a waveform diagram illustrating an example of EM signals for each color outputted from the emission signal output circuit shown in FIG. 11.

Referring to FIG. 12, when the data voltage is increased to drive each of the red light emitting element, the green light emitting element, and the blue light emitting element at maximum driving efficiency, the EM signals EM_R, EM_G, and EM_B for each color may reduce excess luminance values for each color to adjust the color coordinates and white balance of the display device to the ideal target values. For example, the pulse width of the first EM signal EM_R may be set smaller than those of the other EM signals EM_G and EM_B, so that the emission time of the red light emitting element may be less than the emission times of light emitting elements of other colors.

In another embodiment of the present disclosure, the data voltage is increased to drive each of the red light emitting element, the green light emitting element, and the blue light emitting element at maximum driving efficiency, but excess luminance values for each color may be reduced using the pixel driving voltage for each color. The pixel driving voltage for each color may be applied together with the EM signals EM_R, EM_G, and EM_B for each color.

Figure 13:
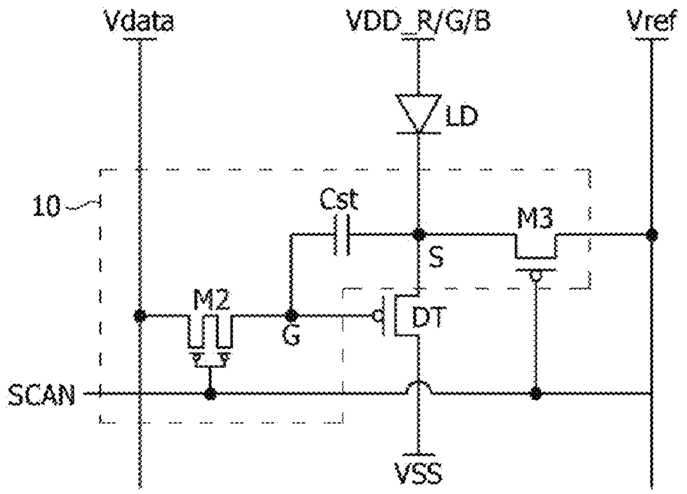
FIG. 13 is a circuit diagram illustrating a pixel circuit according to another embodiment of the present disclosure.

FIG. 13 is a circuit diagram illustrating a pixel circuit according to another embodiment of the present disclosure. In this embodiment, substantially the same components as those in the pixel circuit shown in FIG. 6 are designated by the same reference numerals, and redundant descriptions thereof are omitted.

Referring to FIG. 13, the pixel circuit includes the light emitting element LD, the driving element DT that drives the light emitting element LD, and the compensation circuit 10. The compensation circuit 10 is substantially the same as that shown in FIG. 6. The driving element DT and the switch elements M2 and M3 may be implemented as p-channel transistors, but are not limited thereto. In this embodiment, the first switch element that is turned on/off in response to the EM signal may be omitted, but the present disclosure is not limited thereto.

The pixel driving voltage VDD is separated by color. A first pixel driving voltage VDD_R is applied to the VDD node (e.g., a first node) of the red sub-pixel SP_R, and a second pixel driving voltage VDD_G is applied to the VDD node of the green sub-pixel SP_G. A third pixel driving voltage VDD_B is applied to the VDD node of the blue sub-pixel SP_B. The light emitting element LD includes an anode electrode connected to the VDD node and a cathode electrode connected to the first node S. The second and third switch elements M2 and M3 are turned on in response to the gate-on voltage VGL of the scan signal SCAN and turned off in response to the gate-off voltage VGH of the scan signal SCAN.

Figure 14:
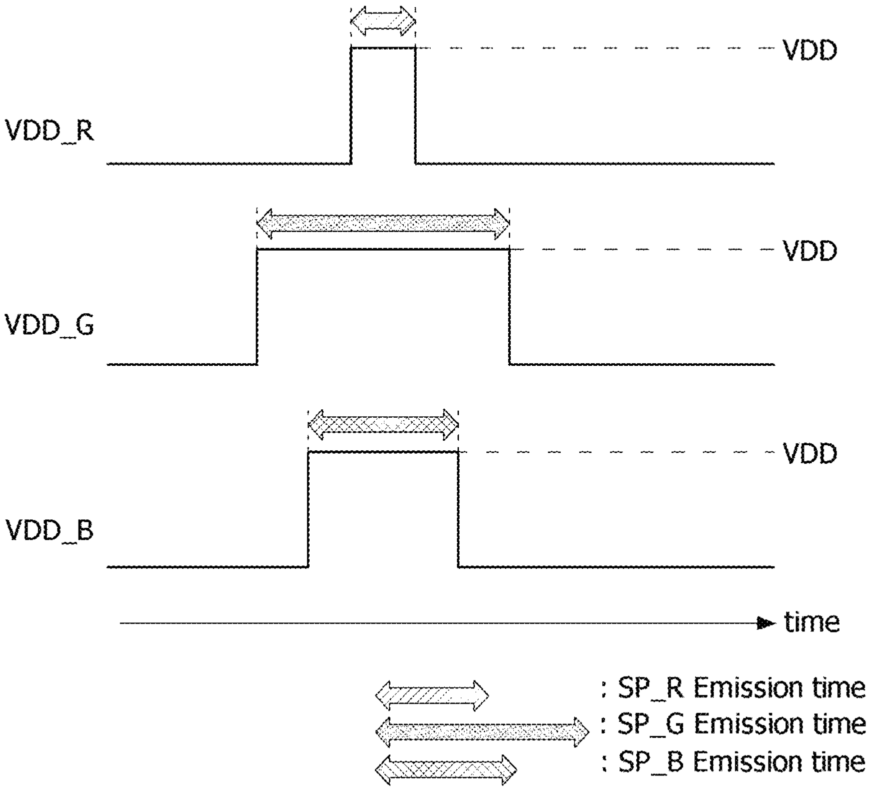
FIG. 14 is a waveform diagram illustrating an example of a pixel driving voltage for each color.

FIG. 14 is a waveform diagram illustrating an example of a pixel driving voltage for each color.

Referring to FIG. 14, the pixel driving voltages VDD_R, VDD_G, and VDD_B for each color are applied to the VDD nodes of the pixel circuit corresponding to the emission times set for each color of the sub-pixels SP_R, SP_G, and SP_B. When the pixel driving voltages VDD_R, VDD_G, and VDD_B for each color are applied to the corresponding VDD nodes of the pixel circuit, a current may be applied to the light emitting element LD, so that the light emitting element LD may emit light. When the pixel driving voltages VDD_R, VDD_G, and VDD_B for each color are not applied, no current may flow through the light emitting element LD, so that the light emitting element LD may not emit light.

The pixel driving voltages VDD_R, VDD_G, and VDD_B for each color may reduce the excess luminance values for each color. For example, in each frame period, the application time (e.g., a first duration) of the first pixel driving voltage VDD_R within one frame period may be set to be less than the application time (e.g., a second duration) of the second pixel driving voltage VDD_G and the application time (e.g., the third duration) of the third pixel driving voltages VDD_B, so that the emission time of the red light emitting element may be reduced compared to the emission times of light emitting elements of other colors. In each frame period, the application time of the third pixel driving voltage VDD_B may be set to be greater than that of the first pixel driving voltage VDD_R and less than that of the second pixel driving voltage VDD_G.

Figure 15:
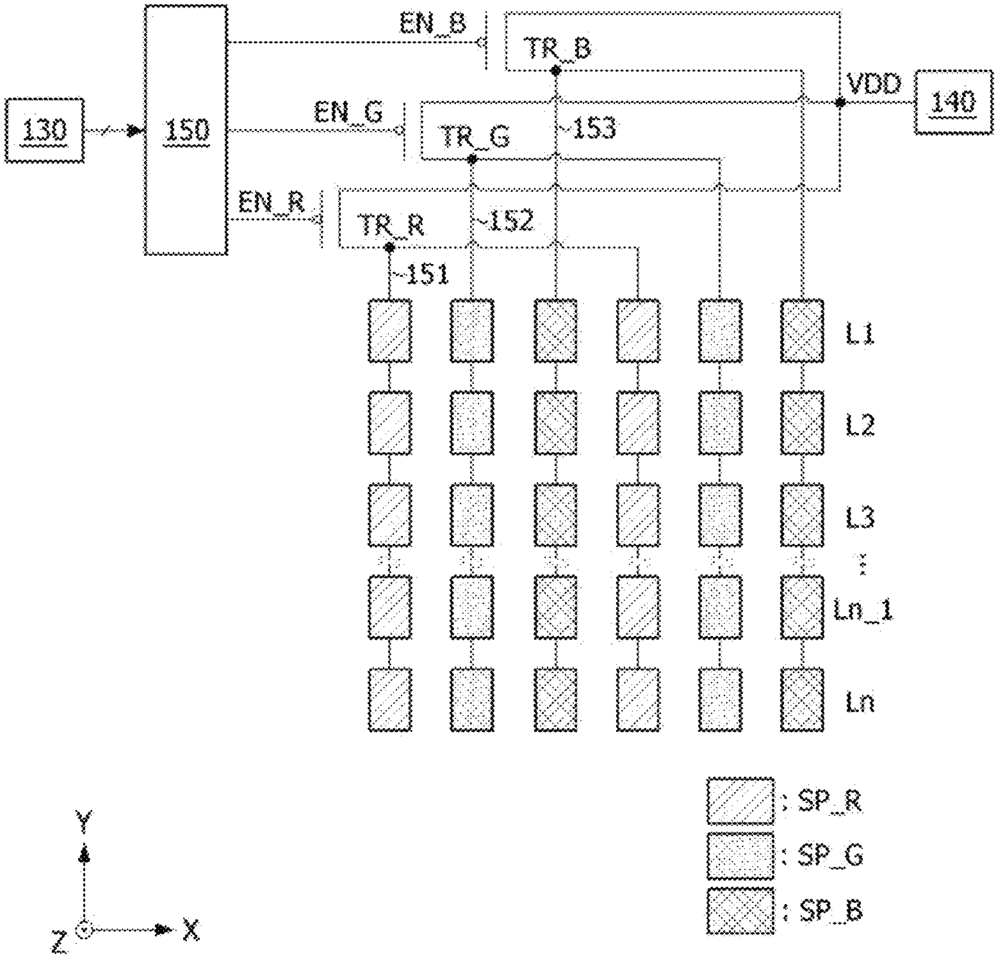
FIG. 15 is a diagram illustrating a pixel driving voltage output circuit according to one embodiment of the present disclosure.

FIG. 15 is a diagram illustrating a pixel driving voltage output circuit according to one embodiment of the present disclosure.

Referring to FIG. 15, the pixel driving voltage output circuit switches the pixel driving voltage VDD outputted from the power supply 140 under the control of the timing controller 130 to output the pixel driving voltages VDD_R, VDD_G, and VDD_B for each color. The pixel driving voltage output circuit includes a first switch element TR_R, a second switch element TR_G, and a third switch element TR_B. Each of the switch elements TR_R, TR_G, and TR_B may be implemented as a p-channel transistor, but is not limited thereto.

The timing controller 130 may control the pixel driving voltage output circuit by generating a power enable signal for individually controlling the on/off timing of each of the switch elements TR_R, TR_G, and TR_B. The power enable signal outputted from the timing controller 130 is converted through the level shifter 150 into a first power enable signal EN_R, a second power enable signal EN_G, and a third power enable signal EN_B that swing between the gate-on voltage VGL and the gate-off voltage VGH.

The first switch element TR_R is turned on in response to the gate-on voltage VGL of the first power enable signal EN_R to supply the pixel driving voltage VDD to a first VDD power line 151. The first VDD power line 151 is connected to the VDD node of the red sub-pixels SP_R. The second switch element TR_G is turned on in response to the gate-on voltage VGL of the second power enable signal EN_G to supply the pixel driving voltage VDD to a second VDD power line 152. The second VDD power line 152 is connected to the VDD node of the green sub-pixels SP_G. The third switch element TR_B is turned on in response to the gate-on voltage VGL of the third power enable signal EN_B to supply the pixel driving voltage VDD to a third VDD power line 153. The third VDD power line 153 is connected to the VDD node of the blue sub-pixels SP_B.

Figure 16:
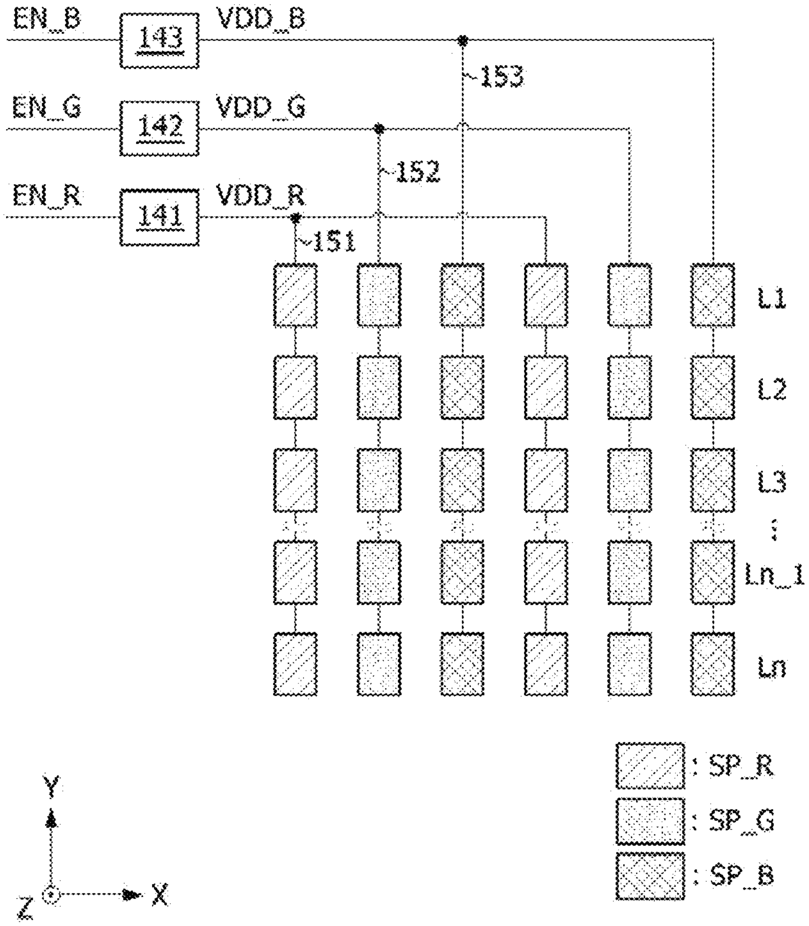
FIG. 16 is a diagram illustrating a pixel driving voltage output circuit according to another embodiment of the present disclosure.

FIG. 16 is a drawing illustrating a pixel driving voltage output circuit according to another embodiment of the present disclosure. In this embodiment, substantially the same components as those in the circuit shown in FIG. 15 are designated by the same reference numerals, and redundant descriptions thereof are omitted.

Referring to FIG. 16, the pixel driving voltage output circuit includes a first VDD output portion 141 (e.g., a first circuit), a second VDD output portion 142 (e.g., a second circuit), and a third VDD output portion 143 (e.g., a third circuit) that output the pixel driving voltage under the control of the timing controller 130. The output timings of the first VDD output portion 141, the second VDD output portion 142, and the third VDD output portion 143 may be individually controlled by the timing controller 130. The first VDD output portion 141, the second VDD output portion 142, and the third VDD output portion 143 may output the pixel driving voltages at the same voltage level, or may output the pixel driving voltages at different voltage levels for each color of the sub-pixels.

The timing controller 130 may control the pixel driving voltage output circuit by generating the power enable signals EN_R, EN_G, and EN_B that individually control the output timings of the VDD output portions 141, 142, and 143. The first VDD output portion 141 supplies the first pixel driving voltage VDD_R to the first VDD power line 151 in response to the first power enable signal EN_R. The second VDD output portion 142 supplies the second pixel driving voltage VDD_G to the second VDD power line 152 in response to the second power enable signal EN_G. The third VDD output portion 143 supplies the third pixel driving voltage VDD_B to the third VDD power line 153 in response to the third power enable signal EN_B.

In each frame period, the sub-pixels SP_R, SP_G, and SP_B may emit light after the programming of all sub-pixels in the display area AA is completed. The emission times of the sub-pixels SP_R, SP_G, and SP_B may be controlled to be different from each other by the EM signals EM_R, EM_G, and EM_B for each color and/or by the pixel driving voltages VDD_R, VDD_G, and VDD_B for each color. For example, the emission time of the red sub-pixel SP_R may be shorter than the emission times of the green and blue sub-pixels SP_G and SP_B. The emission time of the blue sub-pixel SP_B may be longer than the emission time of the red sub-pixel SP_R and shorter than the emission time of the green sub-pixel SP_B.

Figure 17:
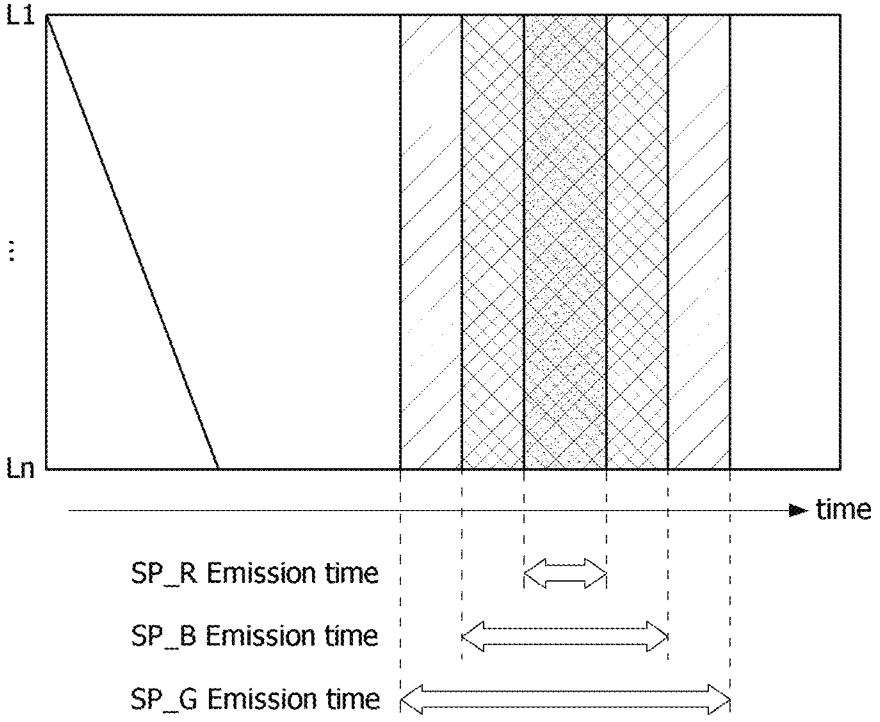
FIG. 17 is a diagram illustrating an embodiment of a method for controlling emission times for each color of sub-pixels.
Figure 18:
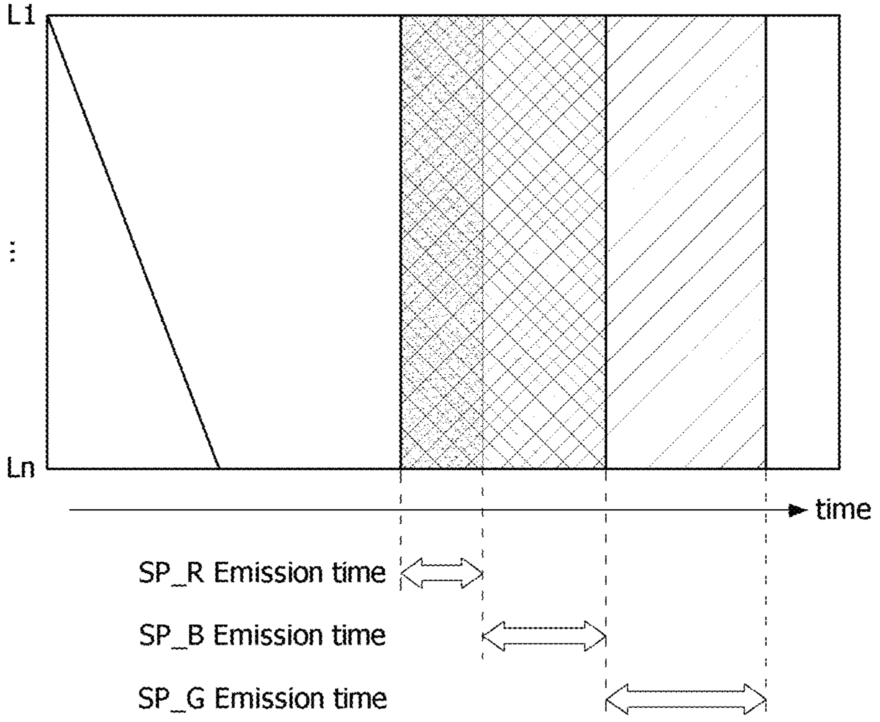
FIG. 18 a diagram illustrating another embodiment of the method for controlling emission times for each color of sub-pixels.
Figure 19:
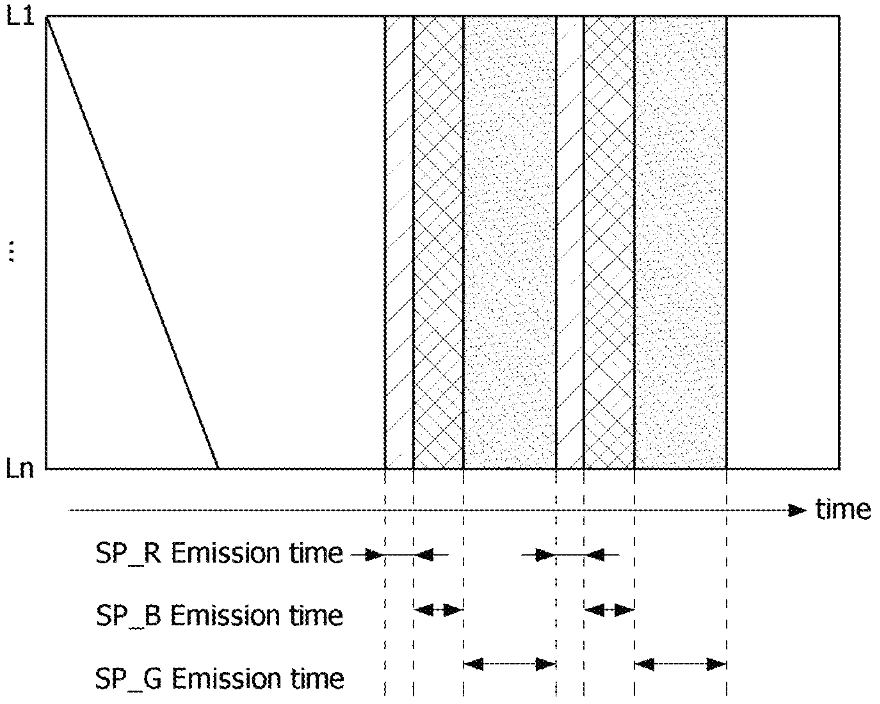
FIG. 19 a diagram illustrating another embodiment of the method for controlling emission times for each color of sub-pixels.

FIGS. 17 to 19 are drawings illustrating various embodiments of a method for controlling the emission times for each color of sub-pixels.

Referring to FIG. 17, the emission times of the sub-pixels SP_R, SP_G, and SP_B may overlap on a time axis. At least two of the emission time of the first sub-pixel SP_R, the emission time of the second sub-pixel SP_G, and the emission time of the third sub-pixel SP_B may overlap on the time axis. For example, after the green sub-pixel SP_G begins to emit light, the blue sub-pixel SP_B may begin to emit light while the green sub-pixel SP_G is emitting light. Subsequently, while the green and blue sub-pixels SP_G and SP_B are emitting light, the red sub-pixel SP_R may begin to emit light. Before the emission time of the green and blue sub-pixels SP_G and SP_B ends, the emission time of the red sub-pixel SP_R may end. After the emission time of the red sub-pixel SP_R ends, the emission time of the blue sub-pixel SP_B may end, and then the emission time of the green sub-pixel SP_G may end.

Referring to FIGS. 18 and 19, the emission times of the sub-pixels SP_R, SP_G, and SP_B may be separated on the time axis. For example, after the emission time of the red sub-pixel SP_R ends, the emission time of the blue sub-pixel SP_B may begin. Subsequently, after the emission time of the blue sub-pixel SP_B ends, the emission time of the green sub-pixel SP_G may begin. Thus, the emission times of the red, green, and blue sub-pixels are non-overlapping in time. As shown in FIG. 19, the emission times of each color may be repeated two or more times within one frame period. In these embodiments, compared to the embodiment shown in FIG. 17, since the current flowing through the light emitting elements LD is separated in time (e.g., non-overlapping in time), heat generation of the display panel 100 may be further reduced.

Depending on the efficiency of the light emitting elements for each color or the operating environment of the display device, the emission times of the sub-pixels SP_R, SP_G, and SP_B may be controlled by any one of the methods shown in FIGS. 17, 18, and 19, or by a combination of two or more thereof. For example, during an $N^{th}$ frame period, the emission times of the sub-pixels SP_R, SP_G, and SP_B may be controlled by the emission time control method of any one of FIGS. 17, 18, and 19, and during an $(N+1)^{th}$ frame period, the emission times may be controlled by another emission time control method.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display device comprising:

a first sub-pixel including a first light emitting element, the first sub-pixel configured to receive a first data voltage and drive the first light emitting element using the first data voltage;

a second sub-pixel including a second light emitting element, the second sub-pixel configured to receive a second data voltage and drive the second light emitting element using the second data voltage;

a third sub-pixel including a third light emitting element, the third sub-pixel configured to receive a third data voltage and drive the third light emitting element using the third data voltage; and a luminance adjuster circuit configured to individually control a first pixel driving voltage applied to the first sub-pixel, a second pixel driving voltage applied to the second sub-pixel, and a third pixel driving voltage applied to the third sub-pixel to reduce a luminance of at least one of the first sub-pixel, the second sub-pixel, or the third sub-pixel, wherein a first emission time of the first light emitting element during which the first light emitting element emits light, a second emission time of the second light emitting element during which the second light emitting element emits light, and a third emission time of the third light emitting element during which the third light emitting element emits light are different from each other.

2. The display device of claim 1, wherein a maximum possible voltage of the first data voltage is higher than a maximum possible voltage of each of the second data voltage and the third data voltage, and a minimum possible voltage of the first data voltage is equal to a minimum possible voltage of the second data voltage and higher than a minimum possible voltage of the third data voltage.

3. The display device of claim 2, wherein the maximum possible voltage of the second data voltage is higher than the maximum possible voltage of the third data voltage, and the minimum possible voltage of the third data voltage is lower than the minimum possible voltage of each of the first data voltage and the second data voltage.

4. The display device of claim 1, wherein at least one of dynamic ranges of the first data voltage, the second data voltage, and the third data voltage, maximum voltages of the first data voltage, the second data voltage, and the third data voltage, and minimum voltages of the first data voltage, the second data voltage, and the third data voltage are different from each other.

5. The display device of claim 4, wherein within one frame period, the first emission time of the first light emitting element is shorter than the second emission time of the second light emitting element and the third emission time of the third light emitting element, the third emission time of the third light emitting element is longer than the first emission time of the first light emitting element and shorter than the second emission time of the second light emitting element, and at least two of the first emission time of the first light emitting element, the second emission time of the second light emitting element, and the third emission time of the third light emitting element overlap in time.

6. The display device of claim 4, wherein within one frame period, the first emission time of the first light emitting element is shorter than the second emission time of the second light emitting element and the third emission time of the third light emitting element, the third emission time of the third light emitting element is longer than the first emission time of the first light emitting element and shorter than the second emission time of the second light emitting element, and at least two of the first emission time of the first light emitting element, the second emission time of the second light emitting element, and the third emission time of the third light emitting element are non-overlapping in time.

7. The display device of claim 1, wherein the first sub-pixel includes a first driving transistor and a first switch transistor connected in series together with the first light emitting element between a first node to which a pixel driving voltage is applied and a second node to which a pixel base voltage is applied, wherein the second sub-pixel includes a second driving transistor and a second switch transistor connected in series together with the second light emitting element between the first node and the second node, and wherein the third sub-pixel includes a third driving transistor and a third switch transistor connected in series together with the third light emitting element between the first node and the second node.

8. The display device of claim 7, wherein the luminance adjuster circuit is configured to output a first emission signal to the first switch transistor, a second emission signal to the second switch transistor, and a third emission signal to the third switch transistor, wherein the first switch transistor is turned on in response to a gate-on voltage of the first emission signal and electrically connects a current path between the first light emitting element and the first driving transistor, wherein the second switch transistor is turned on in response to a gate-on voltage of the second emission signal and electrically connects a current path between the second light emitting element and the second driving transistor, and wherein the third switch transistor is turned on in response to a gate-on voltage of the third emission signal and electrically connects a current path between the third light emitting element and the third driving transistor.

9. The display device of claim 8, wherein a duration of the gate-on voltage of the first emission signal is less than a duration of the gate-on voltage of the second emission signal and a duration of the gate-on voltage of the third emission signal, wherein the duration of the gate-on voltage of the second emission signal is greater than the duration of the gate-on voltage of first emission signal and the duration of the gate-on voltage of the third emission signal, wherein the duration of the gate-on voltage of the third emission signal is greater than the duration of the gate-on-voltage of the first emission signal and less than the duration of the gate-on-voltage of the second emission signal.

10. The display device of claim 9, wherein each of the first sub-pixel, the second sub-pixel, and the third sub-pixel respectively further includes:

a second switch transistor configured to apply a corresponding one of the first data voltage, the second data voltage, or the third data voltage applied through a data line to a gate electrode of a corresponding one of the first driving transistor, the second driving transistor, or the third driving transistor in response to a gate-on voltage of a scan signal applied through a gate line; and a third switch transistor configured to apply a reference voltage to a first electrode of the corresponding one of the first driving transistor, the second driving transistor, or the third driving transistor in response to the gate-on voltage of the scan signal.

11. The display device of claim 10, further comprising:

a first gate driver configured to output the scan signal;

a first emission driver configured to output the first emission signal;

a second emission driver configured to output the second emission signal; and a third emission driver configured to output the third emission signal.

12. The display device of claim 11, wherein the first emission driver supplies the first emission signal to a plurality of first sub-pixels including the first sub-pixel through a first emission signal line that is parallel to the gate line and disposed for each pixel line, wherein the second emission driver supplies the second emission signal to a plurality of second sub-pixels including the second sub-pixel through a second emission signal line that is parallel to the gate line and disposed for each pixel line, wherein the third emission driver supplies the third emission signal to a plurality of third sub-pixels that includes the third sub-pixel through a third emission signal line that is parallel to the gate line and disposed for each pixel line.

13. The display device of claim 11, wherein the first emission signal outputted from the first emission driver is simultaneously supplied to first sub-pixels from a plurality of first sub-pixels that are on different pixel lines from a plurality of pixel lines, wherein the second emission signal outputted from the second emission driver is simultaneously supplied to second sub-pixels from a plurality of the second sub-pixels that are on different pixel lines from the plurality of pixel lines, wherein the third emission signal outputted from the third emission driver is simultaneously supplied to third sub-pixels from a plurality of the third sub-pixels that are on different pixel lines from the plurality of pixel lines, one channel of the first emission driver is connected to the first sub-pixels arranged on the different pixel lines through a first emission signal line that is parallel to the gate line and a first branch line branched from the first emission signal line in a direction parallel to the data line, one channel of the second emission driver is connected to the second sub-pixels arranged on the different pixel lines through a second emission signal line that is parallel to the gate line and a second branch line branched from the second emission signal line in the direction parallel to the data line, and one channel of the third emission driver is connected to the third sub-pixels arranged on the different pixel lines through a third emission signal line that is parallel to the gate line and a third branch line branched from the third emission signal line in the direction parallel to the data line.

14. The display device of claim 10, further comprising:

a switch circuit configured to output the first emission signal via a first channel of the switch circuit, the second emission signal via a second channel of the switch circuit, and the third emission signal via a third channel of the switch circuit, wherein the first emission signal outputted from the first channel of the switch circuit is applied to first sub-pixels from a plurality of the first sub-pixels that are arranged on different pixel lines from a plurality of pixel lines through a first emission signal line that is parallel to the gate line in a non-display area of the display device and a first branch line branched from the first emission signal line in a direction parallel to the data line, wherein the second emission signal outputted from the second channel of the switch circuit is applied to second sub-pixels from a plurality of the second sub-pixels arranged on the different pixel lines through a second emission signal line that is parallel to the gate line in the non-display area of the display device and a second branch line branched from the second emission signal line in the direction parallel to the data line, and wherein the third emission signal outputted from the third channel of the switch circuit is applied to third sub-pixels from a plurality of the third sub-pixels arranged on the different pixel lines through a third emission signal line that is parallel to the gate line in the non-display area of the display device and a third branch line branched from the third emission signal line in the direction parallel to the data line.

15. The display device of claim 1, wherein the first sub-pixel is connected to a first VDD node to which a first pixel driving voltage is applied to the first sub-pixel, the second sub-pixel is connected to a second VDD node to which a second pixel driving voltage is applied to the second sub-pixel, and the third sub-pixel is connected to a third VDD node to which a third pixel driving voltage is applied to the third sub-pixel.

16. The display device of claim 15, wherein a first duration of application of the first pixel driving voltage to the first VDD node of the first sub-pixel within one frame period is less than a second duration of application of the second pixel driving voltage to the second VDD node of the second sub-pixel and a third duration of application of the third pixel driving voltage applied to the third VDD node of the third sub-pixel, wherein the third duration of application of the third pixel driving voltage to the third VDD node of the third sub-pixel within the one frame period is greater than the first duration of application of the first pixel driving voltage to the first VDD node of the first sub-pixel and less than the second duration of application of the second pixel driving voltage to the second VDD node of the second sub-pixel.

17. The display device of claim 15, further comprising:

a power supply configured to output the first pixel driving voltage, the second pixel driving voltage, and the third pixel driving voltage; and a level shifter configured to output a first power enable signal, a second power enable signal, and a third power enable signal, wherein the luminance adjuster circuit includes:

a first switch transistor configured to supply the first pixel driving voltage to a first VDD power line in response to the first power enable signal;

a second switch transistor configured to supply the second pixel driving voltage to a second VDD power line in response to the second power enable signal; and a third switch transistor configured to supply the third pixel driving voltage to a third VDD power line in response to the third power enable signal, wherein the first VDD power line is connected to the first VDD node of a plurality of first sub-pixels that include the first sub-pixel, the second VDD power line is connected to the second VDD node of a plurality of second sub-pixels that include the second sub-pixel, and the third VDD power line is connected to the third VDD node of a plurality of third sub-pixels the third sub-pixel.

18. The display device of claim 15, wherein the luminance adjuster circuit includes:

a first VDD output portion configured to supply the first pixel driving voltage to a first VDD power line in response to a first power enable signal;

a second VDD output portion configured to supply the second pixel driving voltage to a second VDD power line in response to a second power enable signal; and a third VDD output portion configured to supply the third pixel driving voltage to a third VDD power line in response to a third power enable signal, wherein the first VDD power line is connected to the first VDD node of a plurality of first sub-pixels that include the first sub-pixel, the second VDD power line is connected to the second VDD node of a plurality of second sub-pixels that include the second sub-pixel, and the third VDD power line is connected to the third VDD node of a plurality of third sub-pixels that include the third sub-pixel.

19. The display device of claim 1, wherein the first sub-pixel is a red sub-pixel, the second sub-pixel is a green sub-pixel, and the third sub-pixel is a blue sub-pixel.

20. A display device comprising:

a first sub-pixel including a first light emitting element, a first driving element configured to control a current flowing through the first light emitting element based on a gate-source voltage of the first light emitting element, a first switch element configured to switch a current path of the first light emitting element between a pixel driving voltage and a pixel base voltage in response to a first emission signal, and a first compensation circuit configured to receive a first data voltage and a scan signal and apply the first data voltage to a gate electrode of the first driving element;

a second sub-pixel including a second light emitting element, a second driving element configured to control a current flowing through the second light emitting element based on a gate-source voltage of the second driving element, a second switch element configured to switch a current path of the second light emitting element between the pixel driving voltage and the pixel base voltage in response to a second emission signal, and a second compensation circuit configured to receive a second data voltage and the scan signal and apply the second data voltage to a gate electrode of the second driving element;

a third sub-pixel including a third light emitting element, a third driving element configured to control a current flowing through the third light emitting element based on a gate-source voltage of the third driving element, a third switch element configured to switch a current path of the third light emitting element between the pixel driving voltage and the pixel base voltage in response to a third emission signal, and a third compensation circuit configured to receive a third data voltage and the scan signal and apply the third data voltage to a gate electrode of the third driving element; and a luminance adjuster circuit configured to individually control a first pixel driving voltage applied to the first sub-pixel, a second pixel driving voltage applied to the second sub-pixel, and a third pixel driving voltage applied to the third sub-pixel such that a luminance of at least one of the first sub-pixel, the second sub-pixel, and the third sub-pixel is reduced.

21. A display device comprising:

a display panel including a plurality of pixels, the plurality of pixels having at least one-pixel comprising a first sub-pixel configured to emit light of a first color, a second sub-pixel configured to emit light of a second color, and a third sub-pixel configured to emit light of a third color;

a gate driver configured to supply scan signals to the plurality of pixels;

a data driver configured to supply data voltages to the plurality of pixels, the data voltages including a first data voltage having a first possible voltage range that is applied to the first sub-pixel, a second data voltage having a second possible voltage range that is applied to the second sub-pixel, and a third data voltage having a third possible voltage range that is applied to the second sub-pixel, wherein the first possible voltage range, the second possible voltage range, and the third possible voltage range are different from each other; and a luminance adjuster circuit configured to individually control a first duration at which a first pixel driving voltage is applied to the first sub-pixel, a second duration at which a second pixel driving voltage is applied to the second sub-pixel, and a third duration at which a third pixel driving voltage is applied to the third sub-pixel to be different from each other to adjust a first emission time of the first sub-pixel during which the first sub-pixel emits light, a second emission time of the second sub-pixel during which the second sub-pixel emits light, and a third emission time of the third sub-pixel during which the third sub-pixel emits light to be different from each other.

22. The display device of claim 21, wherein a maximum voltage of the first possible voltage range of the first data voltage is greater than a maximum voltage of the second possible voltage range of the second data voltage and a maximum voltage of the third possible voltage range of the third data voltage, and wherein a minimum voltage of the first possible voltage range of the first data voltage is equal to a minimum voltage of the second possible voltage range of the second data voltage and greater than a minimum voltage of the third possible voltage range of the third data voltage.

23. The display device of claim 22, wherein the maximum voltage of the second possible voltage range of the second data voltage is greater than the maximum voltage of the third possible voltage range of the third data voltage, and the minimum voltage of the third possible voltage range of the third data voltage is less than the minimum voltage of the first possible voltage range of the first data voltage and the minimum voltage of the second possible voltage range of the second data voltage.

24. The display device of claim 21, wherein the luminance adjuster circuit is configured to:

supply a first emission signal to a first switch transistor included in the first sub-pixel that is turned on responsive to the first emission signal and the first switch transistor connects a current path between a first light emitting element and a first driving transistor included in the first sub-pixel, supply a second emission signal to a second switch transistor included in the second sub-pixel that is turned on responsive to the second emission signal and the second switch transistor connects a current path between a second light emitting element and a second driving transistor included in the second sub-pixel, and supply a third emission signal to a third switch transistor included in the third sub-pixel that is turned on responsive to the third emission signal and the third switch transistor connects a current path between a third light emitting element and a third driving transistor included in the third sub-pixel.

25. The display device of claim 24, wherein a duration of the first emission signal that turns on the first switch transistor is less than a duration of the second emission signal that turns on the second switch transistor and a duration of the third emission signal that turns on the third switch transistor, wherein the duration of the second emission signal is greater than the duration of the first emission signal and the duration of the third emission signal.

26. The display device of claim 21, wherein the first duration is less than the second duration and the third duration, and the second duration is greater than the first duration and the third duration.

* * * * *